(12) United States Patent
Holten et al.

(10) Patent No.: US 10,694,886 B2
(45) Date of Patent: Jun. 30, 2020

(54) CAPSULE-TYPE CONSUMABLE FOR USE IN A DISPENSER FOR THE PREPARATION OF FOODSTUFF PRODUCTS AND PROCESSING UNIT FOR SUCH A DISPENSER

(71) Applicant: KONINKLIJKE PHILIPS N.V., Eindhoven (NL)

(72) Inventors: Hendrikus Lodewijk Joseph Franciscus Holten, Eindhoven (NL); Jarno Beekman, Eindhoven (NL); Rodin Enne Bruinsma, Eindhoven (NL); Peter Rijskamp, Eindhoven (NL); Jan Klaassen, Eindhoven (NL); Peng Chau Quah, Eindhoven (NL); Joeke Noordhuis, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 366 days.

(21) Appl. No.: 15/531,905

(22) PCT Filed: Dec. 18, 2015

(86) PCT No.: PCT/EP2015/080380
§ 371 (c)(1),
(2) Date: May 31, 2017

(87) PCT Pub. No.: WO2016/097235
PCT Pub. Date: Jun. 23, 2016

(65) Prior Publication Data
US 2017/0280927 A1    Oct. 5, 2017

(30) Foreign Application Priority Data
Dec. 19, 2014    (EP) .................................... 14199124

(51) Int. Cl.
*A47J 31/36*    (2006.01)

(52) U.S. Cl.
CPC ....... *A47J 31/3623* (2013.01); *A47J 31/3628* (2013.01); *A47J 31/3695* (2013.01)

(58) Field of Classification Search
CPC ................ A47J 31/3628; A47J 31/3623; A47J 31/3695; A47J 31/3676; B65D 85/8043; B65D 85/8046
(Continued)

(56) References Cited

U.S. PATENT DOCUMENTS

| 3,260,190 A | 7/1966 | Levinson |
| 6,758,130 B2 | 7/2004 | Sargent |

(Continued)

FOREIGN PATENT DOCUMENTS

| CN | 1431880 A | 7/2003 |
| CN | 102028410 A | 4/2011 |
| DE | 2602832 A1 | 7/1977 |
| EP | 1704803 A1 | 9/2006 |
| EP | 2030915 A2 | 3/2009 |

(Continued)

*Primary Examiner* — Reginald Alexander
(74) *Attorney, Agent, or Firm* — Schott, P.C.

(57) ABSTRACT

The present disclosure relates to a capsule-type, food substance containing consumable (30) for use in a dispenser (10) for preparation of foodstuff products, the consumable (30) comprising a housing (76) comprising at least one rigid wall portion (82) that is impermeable to liquid, an inlet portion (140) arranged to enable pressurized water flow into the housing (76), when the consumable (30) is inserted in a processing unit (14) of the dispenser, at least one primary outlet portion 142) arranged to enable a primary fluid flow out of the housing (76), at least two distinct chambers (34, 36) arranged in the housing (76), and an internal flow control arrangement (84) operatively coupled with at least one of the at least two distinct chambers (34, 36), wherein the internal flow control arrangement (84) is operable between a first state and a second state to selectively permit or prevent a fluid flow from said at least one chamber (34, 36) so as to activate a secondary fluid throughput in the second state. The disclosure further relates to a processing unit (14) for a dispenser (10) and to a dispenser (10).

18 Claims, 10 Drawing Sheets

(58) Field of Classification Search
USPC .............................. 99/295, 323; 426/79, 115
See application file for complete search history.

(56) References Cited

U.S. PATENT DOCUMENTS

| | | | |
|---|---|---|---|
| 7,640,843 B2* | 1/2010 | Halliday | A47J 31/4407 |
| | | | 99/295 |
| 2009/0007796 A1 | 1/2009 | Ricotti | |
| 2014/0255563 A1* | 9/2014 | Rondelli | A47J 31/407 |
| | | | 426/115 |
| 2014/0287099 A1 | 9/2014 | Trombetta | |
| 2014/0318378 A1* | 10/2014 | Ertur | B65D 25/04 |
| | | | 99/295 |
| 2015/0246768 A1* | 9/2015 | Talon | A47J 31/0668 |
| | | | 426/79 |
| 2016/0001968 A1 | 1/2016 | Kruger | |

FOREIGN PATENT DOCUMENTS

| | | |
|---|---|---|
| EP | 2210826 A1 | 7/2010 |
| EP | 2543291 A1 | 1/2013 |
| JP | 2009-018195 A | 1/2009 |
| JP | 2016-500529 A | 1/2016 |
| JP | 2016-502414 A | 1/2016 |
| RU | 2429179 C2 | 9/2011 |
| RU | 2534052 C2 | 11/2014 |
| WO | 2008046740 A1 | 4/2008 |
| WO | 2011010338 A2 | 1/2011 |
| WO | 2011077349 A2 | 6/2011 |
| WO | 2011153272 A2 | 12/2011 |
| WO | 2012100976 A1 | 8/2012 |
| WO | 2014057094 A1 | 4/2014 |
| WO | 2014057098 A1 | 4/2014 |
| WO | 2014131779 A1 | 9/2014 |
| WO | 2014153659 A1 | 10/2014 |

* cited by examiner

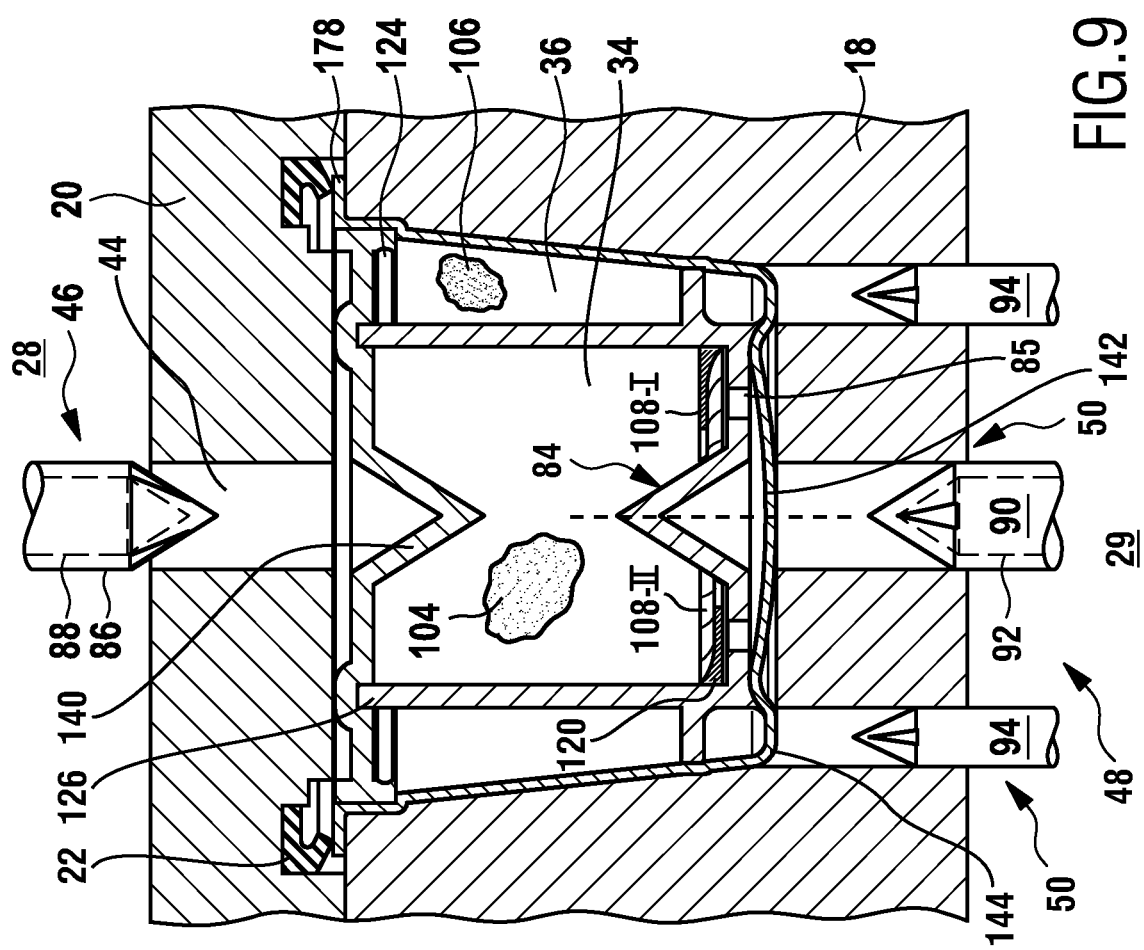
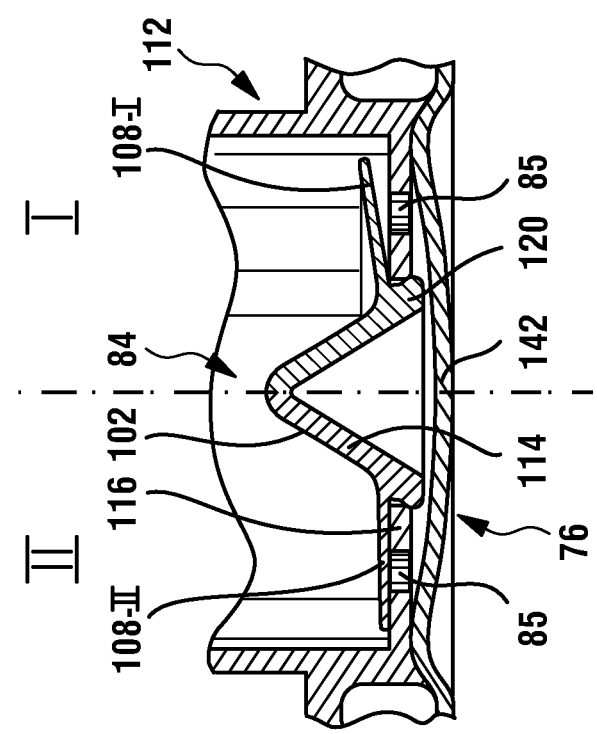

us 10,694,886 B2

CAPSULE-TYPE CONSUMABLE FOR USE IN A DISPENSER FOR THE PREPARATION OF FOODSTUFF PRODUCTS AND PROCESSING UNIT FOR SUCH A DISPENSER

This application is the U.S. National Phase application under 35 U.S.C. § 371 of International Application No. PCT/EP2015/080380, filed on Dec. 18, 2015, which claims the benefit of International Application No. 14199124.0 filed on Dec. 19, 2014. These applications are hereby incorporated by reference herein.

FIELD OF THE INVENTION

The present disclosure relates to the area of appliances (generally referred to as beverage dispensers herein) that prepare a beverage via extraction of food substances through the passage of an extraction fluid, such as hot or cold water, under pressure. The food substance, such as coffee or tea, is contained in consumables that are inserted in these appliances. A beverage may thus generally be coffee, tea, soup, hot or cold chocolate, milk or baby food.

More particularly, the present disclosure relates to consumables (also referred to as capsule or pod) that comprise a plurality of internal chambers that serve different purposes. The present disclosure further relates to a processing unit for a dispenser and to a foodstuff dispenser that may process the aforementioned consumables.

BACKGROUND OF THE INVENTION

WO 2014/057098 A1 discloses a cartridge for containing food or beverage ingredients comprising a substantially planar and rigid base portion, at least two ingredient compartments for storing the ingredients and at least two discharge portions, each discharge portion being linked to one of the compartments and being formed by recesses protruding from the plane of the base portion, and at least one sealing member provided on the base portion covering the compartments and discharge portions on the base portion side of the card, wherein the card is designed for insertion in a food and beverage preparation device to dispense the ingredients from the compartments via the discharge portions. Further, a flow controlling element is provided, the flow controlling element arranged in at least one discharge portion and being moveable therein, said flow controlling element comprising channels to allow the ingredients to pass the discharge portions, wherein the flow controlling element comprises a piercing member for piercing a closing means closing an inlet or outlet of a discharge portion.

DE 26 02 832 A1 discloses a capsule made of glass, the capsule comprising a housing and a sealing plate arranged within the housing, wherein the sealing plate delimits an ingredient chamber within the housing, wherein the sealing plate is arranged to deform in response to the application of pressure so as to enable a fluid flow out of the capsule.

Further arrangements of beverage capsules are known from US 2009/007796 A1, EP 2 030 915 A2 and WO 2014/057094 A1.

A beverage dispensing appliance is known from EP 2 543 291 A1. The document discloses a beverage production machine comprising a brewing head for the production of a beverage, the brewing head comprising a brewing chamber comprising at least two brewing chamber portions movable with respect to each other, a water heater, a hot water duct for feeding hot pressurized water in said brewing chamber from said water heater, a dispensing duct from which said beverage is dispensed, and a structural frame supporting said at least two brewing chamber portions, on which forces generated by the pressurized water in the brewing chamber during brewing are discharged, wherein said structural frame includes said water heater.

The consumables (also called single-serve units or disposable consumables) currently in use are basically of two types. One type of consumable is generally called a "capsule" and is basically a unit with rigid walls containing the food substance and that has two bases through which the extraction water passes. The capsules are placed into chambers defined by two bodies, one shaped to receive most of the capsule and a closing body which tightly seals the chamber. The water is introduced into the chamber and then traverses the capsule. Thanks to the rigid shape of the capsule, the hydraulic seals of the chamber allow the water to basically traverse the capsule without recirculating the extracted substance through the chamber.

A second type of consumable of a flat shape is generally called a "pod" (or "pad") and may consist of two sections made of thin soft material, cut and paired in order to define a cavity in which the food substance is placed. The material may be for example paper, or a cloth or a non-woven fabric with filtering properties. The two sections are generally circular and are coupled along their outer edges, defining an outer annular flange. The machines which use pods may have two half-shells which are sealed to define a chamber where the pod is placed. Specifically, the annular flange of the pod may be received between the opposite surfaces of the half-shells, defined outside the chamber. Generally, coffee-based pods may be regarded as pre-packaged ground coffee beans in their own filter.

The present disclosure focuses on capsule-type consumables. There is a general need to further improve the flavor, quality and appearance of dispensed foodstuff products, particularly coffee-based or similar beverages. This may particularly apply to the variety of products that may be obtained from consumables. There is a general desire for no-standard beverages such as cappuccino, cafe latte, latte macchiato, etc. These non-standard beverages typically require processing multiple ingredients in accordance with a defined way of preparation. Preferably, the respective non-standards beverages resemble beverage products that can be obtained only from high-priced sophisticated espresso machines and suchlike that are difficult to operate, maintain and clean.

SUMMARY OF THE INVENTION

It is an object of the present invention to provide an alternative approach to the preparation of foodstuff products, particularly beverages, that may be obtained from capsule-based consumables and that may comprise different components or layers. Preferably, respective consumables and beverage processing units are provided in the context of the present disclosure that may facilitate the formation of non-standard beverages, particularly coffee-beverages such as cappuccino, cafe latte, latte macchiato, etc. More preferably, consumables for preparation of beverages may be provided that permit and enhanced functionality in the course of the preparation of the desired foodstuff products while costly and complex control elements at the level of the beverage dispenser may be avoided.

In a first aspect of the present disclosure, a capsule-type, food substance containing consumable for use in a dispenser for preparation of foodstuff products, particularly beverages, is presented, the consumable comprising a housing comprising at least one rigid wall portion that is impermeable to liquid, an inlet portion arranged to enable pressurized water flow into the housing, when the consumable is inserted in a processing unit of the dispenser, at least one primary outlet portion arranged to enable a primary fluid flow out of the housing, at least two distinct chambers arranged in the housing, and an internal flow control arrangement operatively coupled with at least one of the at least two distinct chambers, wherein the internal flow control arrangement is operable between a first state and a second state to selectively permit or prevent a fluid flow from said at least one chamber so as to activate a primary fluid throughput in the first state and a secondary fluid throughput in the second state.

This aspect is based on the insight that a consumable that is provided with internal controls may enhance the flavor, quality and appearance of the processed foodstuff product perceived by a consumer. In other words, the consumable may be referred to as smart consumable since internal controls are provided that may selectively influence an output flow. By way of example, the internal flow control arrangement may be arranged as a "switch" that selectively activates an output flow of the first chamber or the second chamber. In other words, the consumable may be arranged as a multi-chamber consumable or, more particularly, a multi-chamber capsule. Hence, assuming that different food substances (e.g., coffee-based and milk-based) are provided in the consumable, a defined outlet flow may be achieved that allows to create defined layers in the to-be-processed foodstuff product. When a respective flow control arrangement, particularly a respective valve, is provided at the level of the consumable, the foodstuff preparation appliance (also referred to as dispenser) may still have a relatively simple design and may be provided with rather standard components and controls. As a consequence, the consumable may add an enhanced functionality to the dispenser.

The first state of the flow control arrangement may be referred to as open state. The second state of the internal flow control arrangement may be referred to as closed state. The flow control arrangement may be actuable between or movable between the first state and the second state. The internal flow control arrangement may comprise a relatively simple design and therefore does not cause a considerable increase in manufacturing costs. By way of example, the internal flow control arrangement may comprise a single (additional) part that is added to a standard configuration of a conventional consumable. Furthermore, at least in some embodiments, the internal flow control arrangement may comprise elements that are integrally formed with other elements of the consumable. Generally, the internal flow control element may comprise at least one control valve or control valve arrangement.

The capsule-type, food substance containing consumable is arranged to be inserted and processed in a processing unit of a dispenser, such as a beverage dispenser or capsule-type coffee machine. The food substance may be a food extract, such as ground coffee, milk powder, and suchlike.

It is particularly preferred that the flow control arrangement is actuable by inherent means of the foodstuff preparation process. In other words, no distinct actuation elements have to be provided. By way of example, the internal flow control arrangement may be directly actuable by the fluid flow that is led into the housing at the inlet portion and that flows out of the housing at the primary outlet portion or the secondary outlet portion. Since no further actuating elements are required in this embodiment, the consumable is suited for use in rather standard dispensing appliances.

Since the internal flow control arrangement is an integrated component of the consumable, the flow control arrangement may be particularly adapted to the respective kind and type of consumable. Even if the dispensing appliance is not "aware" of the currently to-be-process consumable, enhanced preparation modes may be enabled.

By way of example, the internal flow control arrangement may be actuated by varying characteristics of the pressurized water input flow. Consequently, the internal flow control arrangement can be mediately operated by the dispensing appliance without the need of sophisticated controls and actuating elements.

In one embodiment, the consumable further comprises at least one secondary outlet portion arranged to enable a distinct secondary fluid flow out of the housing, wherein a first chamber of the at least two distinct chambers is coupled to the at least one primary outlet portion, and wherein a second chamber of the at least two distinct chambers is coupled to the at least one secondary outlet portion. Consequently, the internal flow control arrangement may be utilized to selectively activate an output flow through the respective outlet portion the control arrangement is associated with.

In another corresponding embodiment, the internal flow control arrangement is associated with the at least one primary outlet portion or the at least one secondary outlet portion, wherein the internal flow control arrangement is operable between a first state in which an output flow through the respective outlet portion is enabled, and a second state, in which the output flow output flow through the respective outlet portion is at least substantially prevented.

It may be further preferred in this context that the foodstuff product is coffee-based, wherein the at least two distinct chambers comprise food substances, wherein the first chamber comprises a milk product, particularly milk powder, and wherein the second chamber comprises ground coffee. Consequently, so-called premium coffee products such as cappuccino, cafe latte, latte macchiato, etc. may be prepared. Generally, coffee-based or similar beverages that are based on more than one component may be processed accordingly. Each of the at least two distinct chambers may contain a respective food substance. For some beverages, it may be desirable to adhere to a specific order when preparing the product. For instance, cappuccino-based beverages may comprise a first layer that contains particularly hot milk, a second layer that contains particularly coffee or espresso, and a third layer that may be arranged as a foamed milk foam layer. Consequently, the internal flow control arrangement of the consumable may be actuated so as to first enable a combined milk flow comprising a liquid component and a foam component in the first state. In the course of the preparation of the foodstuff product, the internal flow control arrangement may be actuated and brought into the second state in which the milk-based fluid flow is stopped or at least significantly reduced and in which a coffee flow is enabled. The coffee may then be arranged or deposited on the liquid milk layer, whereas the milk foam layer is "lifted" to the top of the liquid coffee layer. Further products/components that may be formed in a similar fashion and comprise at least two layers may be prepared accordingly.

Furthermore, beverages are known that first require the extraction of a flavor from a food substance so as to form a first (rather strong) layer to which then in the course of the preparation of the foodstuff product water is added. In this way, cafe americano and similar beverages may be prepared. In these embodiments, at least one of the at least two distinct chambers does not necessarily have to contain a respective food substance. For instance, referring again to cafe americano or similar beverages, the first chamber may comprise ground coffee from which the espresso-like base layer is extracted, wherein the second chamber may be arranged as a basically empty or hollow chamber that primarily acts as a water conduit in the second stage of the preparation process so as to allow additional water to bypass the first chamber to be added to the espresso-based base layer.

The food substance or the food substances that is/are provided in the chambers of the consumable may be contained in or retained by a filter web or a similar filtering element that prevents large powdered or ground particles from being entrained by the water that flows through the consumable.

In yet another embodiment, the at least one rigid wall portion of the housing is made from metal material or plastic material and shaped in a basically rotationally symmetric fashion defining an inlet end associated with the inlet portion, and an outlet end associated with the primary outlet portion and the secondary outlet portion, wherein the consumable comprises an inner housing that subdivides the housing into the at least two distinct chambers, wherein the primary outlet portion is associated with the first chamber, and wherein the secondary outlet portion is associated with the second chamber. Generally, the inner housing may be a separately molded plastic component that may be arranged or received in the housing, particularly a central portion of the housing.

It may be further preferred in accordance with this embodiment that the internal flow control arrangement is arranged at a central portion of the inner housing and adjacent to the outlet end of the consumable. Consequently, the internal flow control arrangement may be enclosed in the sealed housing of the consumable, particularly before being processed in the dispenser. Hence, the consumable may maintain its sealed arrangement which may prolong the "shelf life" of the consumable.

By way of example, the flow control arrangement may comprise a valve body that is arranged at a central opening or receiving opening of the inner housing and further adapted to selectively cover and release (or: expose) flow passages or conduits that are provided in the inner housing, particularly in an end wall thereof adjacent to or in the vicinity of the flow control arrangement.

In yet another embodiment of the consumable, the first chamber comprises a basically circular profile, wherein the second chamber comprises a basically annular profile that surrounds the profile of the first chamber, wherein the primary outlet portion is arranged at a central portion of the outlet end, and wherein the secondary outlet portion is arranged at a peripheral region of the outlet end.

In the alternative, the internal flow control arrangement may be shaped in a basically annular fashion and arranged the second chamber between the inner housing and the housing. Consequently, the internal flow control arrangement may be configured to control an internal flow in the second chamber and, in a mediate way, may further at least influence the internal flow in the first chamber.

In still another embodiment of the consumable, the internal flow control arrangement comprises at least one flow control valve, particularly a pressure-dependent or flow-dependent flow control valve, which is operable based on internal fluid flow properties. Consequently, an increase or decrease of the pressure or flow may actually "trigger" the actuation of the internal flow control arrangement. By way of example, the internal flow control arrangement may comprise at least one valve that is arranged as a flap valve that may be moved between the first state and the second state. Preferably, an inherent retaining force is provided that urges the valve into the first state. Consequently, to bring the valve into the second state, a respective actuating force needs to be applied which may be caused by a significant increase in pressure or in (fluid) flow.

In still another advantageous embodiment, the internal flow control arrangement at least substantially blocks the respective output flow when a flow parameter, particularly pressure or throughput, exceeds to a defined threshold. In this way, the primary outlet flow may be substantially blocked while the secondary outlet flow may be activated. The internal flow control arrangement may be adapted to seal or cover an opening or through-hole in the second state so as to prevent fluid transfer through the opening. More particularly, the internal flow control arrangement may block a respective outlet portion such that the output flow substantially bypasses the respective outlet portion and flow through another outlet portion.

In yet another embodiment of the consumable, the internal flow control arrangement comprises a flow control valve that is made from resilient material. Preferably, the flow control valve is made from rubber or rubber-based material. Furthermore, the flow control valve can be made from plastic material, etc. Preferably, a single flow valve is provided.

In still another embodiment, the flow control valve comprises a deflectable portion that selectively covers a respective flow passage of the consumable in the second state and exposes the flow passage in a first state. By way of example, the control valve may be basically shaped in a rotationally symmetric fashion. Consequently, a ring-shaped or annular deflectable portion may be provided at an outer edge or an inner edge of the control valve. The deflectable portion may be deformed upon the exertion of external loads or forces that may be attributable to the flow throughput or the pressure of the fluid.

It may be further preferred in this context that the deflectable portion, in the absence of external loads, is in a substantially steady condition and at least partially bent away or lifted from respective flow conduits of the consumable deformed flow passage, wherein an external load, caused by an increased flow (throughput) or an increased pressure, deforms the deflectable portion when transitioning between the first state and the second state.

To this end, rather simple controls may be provided at the dispensing appliance that may enable a modification of the flow (throughput) or of the pressure of the input flow. However, at least in some embodiments, the flow control arrangement may be actuated without any additional action at the level of the dispensing appliance. This may be achieved for instance when a fill level of the consumable exceeds a defined threshold such that an internal pressure of the consumable increases accordingly. Also in this way, the flow control arrangement may be automatically actuated so as to be moved between a first state and the second state.

At least two consumables may define a set of consumables comprising at least two consumables for use in a beverage dispenser for preparation of a beverage. It is preferred that at least one of the consumables is formed in accordance with at least some aspects of the present disclosure.

In another aspect of the present disclosure, a processing unit for a dispenser for preparation of foodstuff products is presented, the processing unit comprising:

a receiving cavity for receiving a consumable, and a receiving cavity comprising at least a first receiving portion and at least a first fastening portion, a sealing unit arranged to contact, at an inlet side, a first end of the consumable, such that an inlet portion of the consumable can be engaged in a basically pressure-tight manner, an inlet engagement unit that is coupled to an inlet conduit through which pressurized water can be supplied, wherein the inlet engagement unit is operable to engage the inlet portion of the consumable to process a foodstuff product inlet consumable, an outlet engagement arrangement comprising:

a primary outlet engagement unit that is operable to engage at least one primary outlet portion of the consumable at an outlet side thereof to enable the process foodstuff product to flow out of the consumable, and an input flow steering arrangement that is operable to control flow parameters of an input flow to actuate an internal flow control arrangement of the consumable, wherein the processing unit is arranged to process a consumable in accordance with at least one embodiment described herein so as to operate the internal flow control arrangement thereof.

At least one of the inlet engagement unit, the primary outlet engagement unit and the secondary outlet engagement unit may be arranged as a piercing unit. Consequently, at least in some embodiments, respective inlet piercing units, primary outlet piercing units and/or secondary outlet piercing units may be provided that may rapture the consumable to access the respective chambers.

However, in the alternative, at least one of the transfer portions (inlet portion, primary outlet portion and/or secondary outlet portion) of the consumable may be engaged and/or connected without an actuable piercing unit. In some embodiments, at least one transfer portion may comprise a manually releasable seal. In some embodiments, at least one transfer portion may comprise a meltable or fusible material that can be fluidized and removed by applying a hot fluid thereto, particularly hot water and/or a hot foodstuff product. In some embodiments, at least one transfer portion may be arranged to cooperate with a basically fixed piercing element of the processing unit when the consumable swells in the course of being supplied with hot pressurized water. In some embodiments, at least one of the transfer portions may comprise a weakened portion, particularly a thinned portion, which may be raptured when the consumable is pressurized by applying the pressurized liquid thereto in the course of preparing the foodstuff product.

Preferably, consumables in accordance with at least some embodiments disclosed herein can be processed in the processing unit. Generally, the engagement or piercing units may engage the respective counter-portions by rupturing the housing of the consumable. In some embodiments, the secondary outlet engagement unit may be provided in combination with the primary outlet engagement unit or the inlet engagement unit. In the alternative, the secondary outlet engagement unit may be a separate and distinct component.

In one embodiment of the processing unit, at least one of the inlet engagement unit and the primary and/or secondary outlet engagement unit comprises a piercer that is provided with an internal conduit through which a fluid flow may be transferred.

In still another embodiment, the processing unit further comprises a secondary outlet engagement unit that is operable to engage at least one secondary outlet portion of the consumable at the outlet side to enable the process foodstuff product to flow out of the consumable, and an engagement control unit that is operable to control the at least one secondary outlet engagement unit such that the primary outlet engagement unit and yet at least one secondary outlet engagement unit engage the consumable in a time-displaced manner. Preferably, the input flow steering arrangement and the engagement control unit are coupled to co-ordinate or synchronize an increase in the input flow and the engagement of the at least one secondary outlet engagement unit. In other words, a defined (temporal or causal) connection between the actuation of the internal flow control arrangement which may be induced by the input flow steering arrangement and the engagement of the secondary outlet engagement unit may be achieved. Hence, when the internal flow control arrangement actually moves from the first state to the second state, the secondary outlet engagement unit may engage the respective outlet portion of the consumable so as to enable an outlet flow. As a consequence, an outlet flow through the primary outlet portion and the primary outlet engagement unit may be stopped or at least significantly reduced. This may be beneficial to "switch" between distinct food substances (e.g. coffee-based vs. milk-based) in the course of the preparation of the foodstuff product.

In still another embodiment, the processing unit further comprises a magnetic actuator unit, particularly an actuator coil, wherein the magnetic actuator unit is operable to exert an actuation force on a movable valve member of the internal flow control arrangement of the consumable to remotely operate the valve member between a first state and a second state to selectively permit or prevent a fluid flow from said at least one chamber. Consequently, the internal flow control arrangement of the consumable may be remotely actuated. The magnetic actuator unit may be provided in addition to the input flow steering arrangement that is operable to control flow parameters of the input flow. Consequently, both the actuator unit and the input flow steering arrangement may contribute to the operation of the internal flow control arrangement, particularly of the internal flow control valve. In some embodiments, the actuator unit solely may operate the input flow steering arrangement. Consequently, processing units may be envisaged that to not necessarily implement an input flow steering arrangement that is utilized to actuate the internal flow control arrangement. In case both the input flow steering arrangement and the magnetic actuator unit are provided, a respective setting for the actuation of the internal flow control arrangement may be varied on a case by case basis, e.g. dependent on the currently to-be-processed type or flavor of the consumable.

In still another aspect of the present invention, a dispensing appliance for preparation of foodstuff products, particularly a beverage dispenser, is presented, the dispensing appliance comprising:

a water tank, a pump unit for pressurizing water supplied from the water tank, a heating unit for heating pressurized water, and a processing unit in accordance with at least some aspects described herein.

Preferably, the dispensing appliance is arranged to process consumables in accordance with at least some embodiments disclosed herein. Needless to say, the dispensing appliance may be arranged to prepare different types of foodstuff products that can be obtained from different types of consumables. Hence, the dispensing appliance may be arranged to process conventional single-chamber capsules as well. The heating unit may be arranged as a flow-through heater, a boiler or a similar heating device. Further, the dispensing appliance may be basically configured to process pre-heated water conducted thereto from an external heating unit. Basically, the heating unit may be arranged downstream of the pump unit. In the alternative, the pump unit may be arranged downstream of the heating unit. Preferably, the dispensing appliance, particularly the processing unit thereof, is provided with a flow control and/or pressure control unit that selectively controls and influences flow parameters (e.g. throughput, pressure, temperature, etc.), of the input flow. Accordingly, the internal flow control arrangement of the consumable in accordance with some aspects of the current disclosure may be mediately actuated by a change in respective flow properties.

In still another aspect of the present disclosure, a use of a consumable in a dispensing appliance for preparation of foodstuff products is presented, the dispensing appliance comprising:

a processing unit in accordance with at least one embodiment as disclosed herein including an input flow steering arrangement that is operable to control flow parameters of an input flow to actuate an internal flow control arrangement of the consumable;

the consumable comprising:

a housing comprising at least one rigid wall portion that is impermeable to liquid, an inlet portion arranged to enable pressurized water flow into the housing, when the consumable is inserted in the processing unit, at least one primary outlet portion arranged to enable a primary fluid flow out of the housing, at least one secondary outlet portion arranged to enable a secondary fluid flow out of the housing, and an internal flow control arrangement associated with the at least one primary outlet portion or the at least one secondary outlet portion, wherein the internal flow control arrangement is operable between a first state, in which an output flow through the respective outlet portion is enabled, and a second state, in which the output flow through the respective outlet portion is at least substantially prevented; wherein the input flow steering arrangement is operated to actuate the internal flow control arrangement.

BRIEF DESCRIPTION OF THE DRAWINGS

These and other aspects of the invention will be apparent from and elucidated with reference to the embodiment(s) described hereinafter. In the following drawings FIG. 8 shows a partial cross-sectional side view of an embodiment of a consumable in accordance with the present disclosure, the consumable comprising an internal flow control arrangement shown in a first state I and a second state II, FIG. 9 shows a cross-sectional side view of another exemplary embodiment of a consumable in accordance with the present disclosure, the consumable being arranged in a receiving cavity, the consumable comprising an internal flow control arrangement shown in a first state I and a second state II.

DETAILED DESCRIPTION OF THE INVENTION

Figure 1:
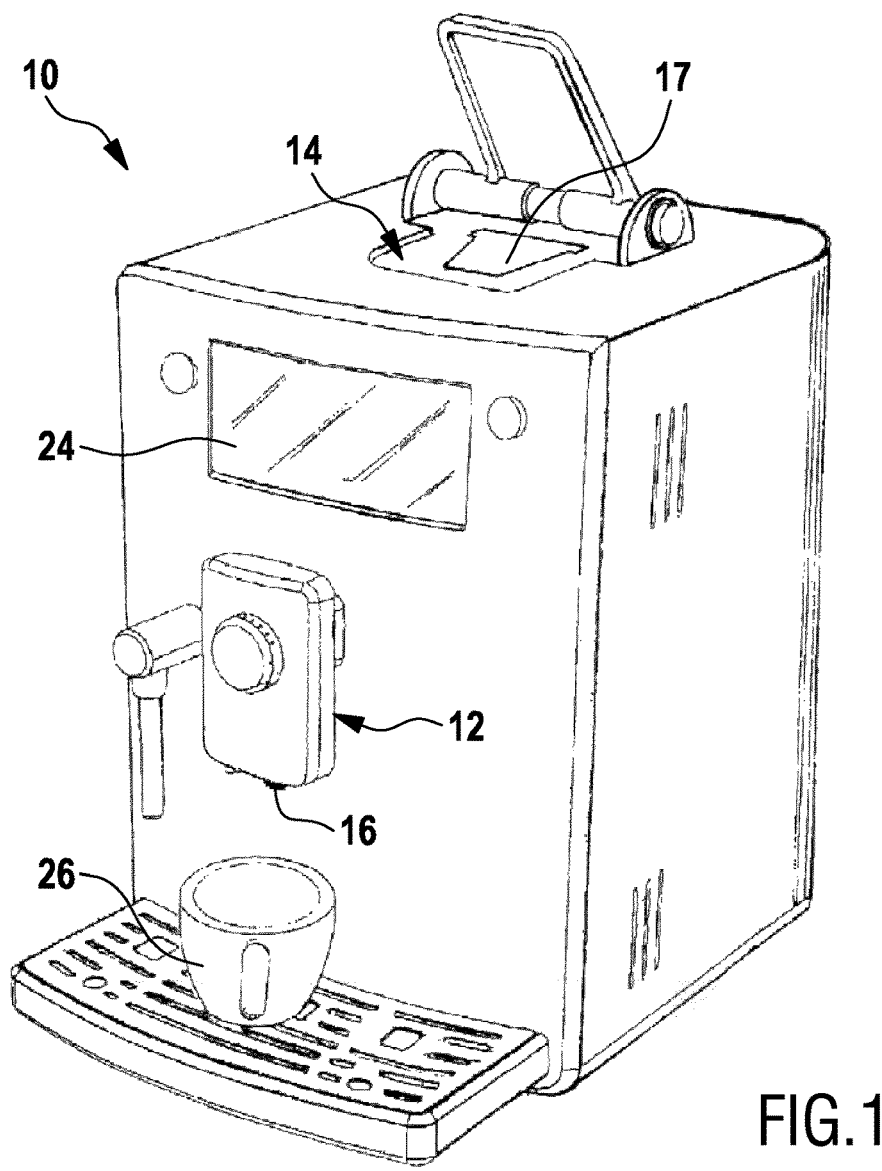
FIG. 1 shows a perspective view of an embodiment of a beverage dispenser, particularly a coffee making appliance.

FIG. 1 shows a perspective view of a dispenser 10, which may be also referred to as coffee making appliance hereinafter. The dispenser 10 may generally, together with consumables 30 (refer also to FIG. 2), form a beverage preparation system. Typically, the dispenser 10 uses capsules as consumables 30. Capsule-based consumables 30 may be referred to as rigid consumables 30 and have the major advantage over soft pad based consumables that they can seal a foodstuff product and its flavor for a considerably long time. In some embodiments the beverage dispenser 10 is configured to be used for making other beverages than coffee, e.g. tea, hot or cold milk, soup, baby food, etc. Further, the consumables 30 generally contain a corresponding food substance for the preparation of the respective beverage by use of the beverage dispenser.

With respect to an exemplary embodiment of the dispenser 10, particular reference is made to EP 2 543 291 A1. Further reference in this respect is made to WO 2011/077349 A2.

The dispenser 10 may comprise a dispensing head 12 from which a processed product, particularly a processed beverage, may be obtained. The dispensing head 12 may comprise an outlet portion 16 including an outlet duct to fill a container or cup 26 with the foodstuff product. The dispenser 10 may further comprise a processing unit 14 which will be described further below in more detail. The processing unit 14 may be configured to receive and process consumables 30, particularly capsules containing food substances, such as ground coffee-based products. By way of example, the processing unit 14 may comprise a receiving cavity 17 that may comprise a receiving portion 18 and a fastening portion 20 for receiving and sealing a to-be-processed consumable 30, refer also to FIG. 3. Furthermore, user controls 24 may be provided that may comprise a display, a touchscreen, switches, control buttons, etc.

Figure 2:
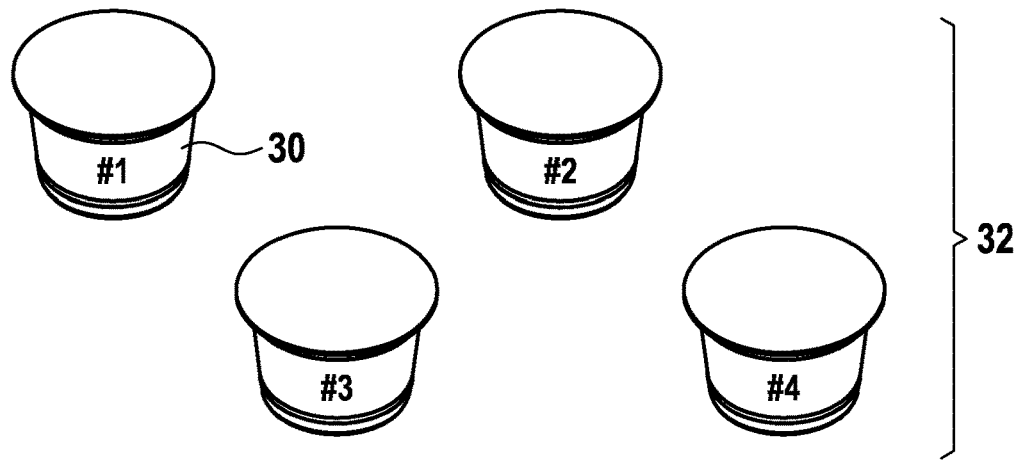
FIG. 2 shows an illustrative perspective top view of a set of consumables, particularly capsules, which can be used in dispensing appliances.

FIG. 2 is a perspective top view of an exemplary set 32 of capsules 30. The set 32 of capsules 30 may comprise at least two consumables 30. By way of example, the set 32 of capsules 30 may comprise a plurality of consumables 30 of the same type of flavor. Further, the set 32 of capsules 30 may comprise a plurality of consumables 30 at least some of which represent different types and/or flavors.

Figure 3:
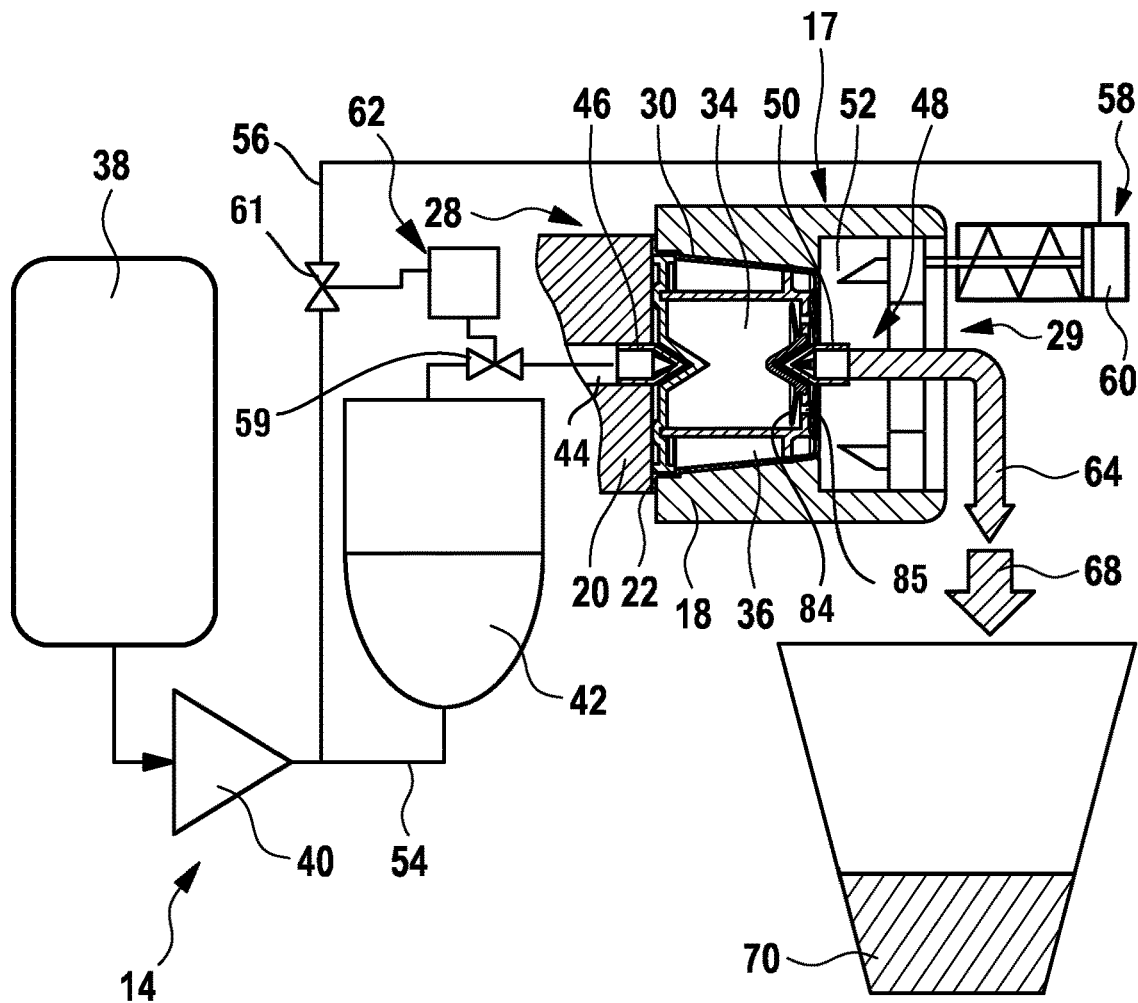
FIG. 3 shows a simplified schematic illustrative block representation of an exemplary embodiment of a processing unit, particularly a brewing unit, for a dispenser.
Figure 5:
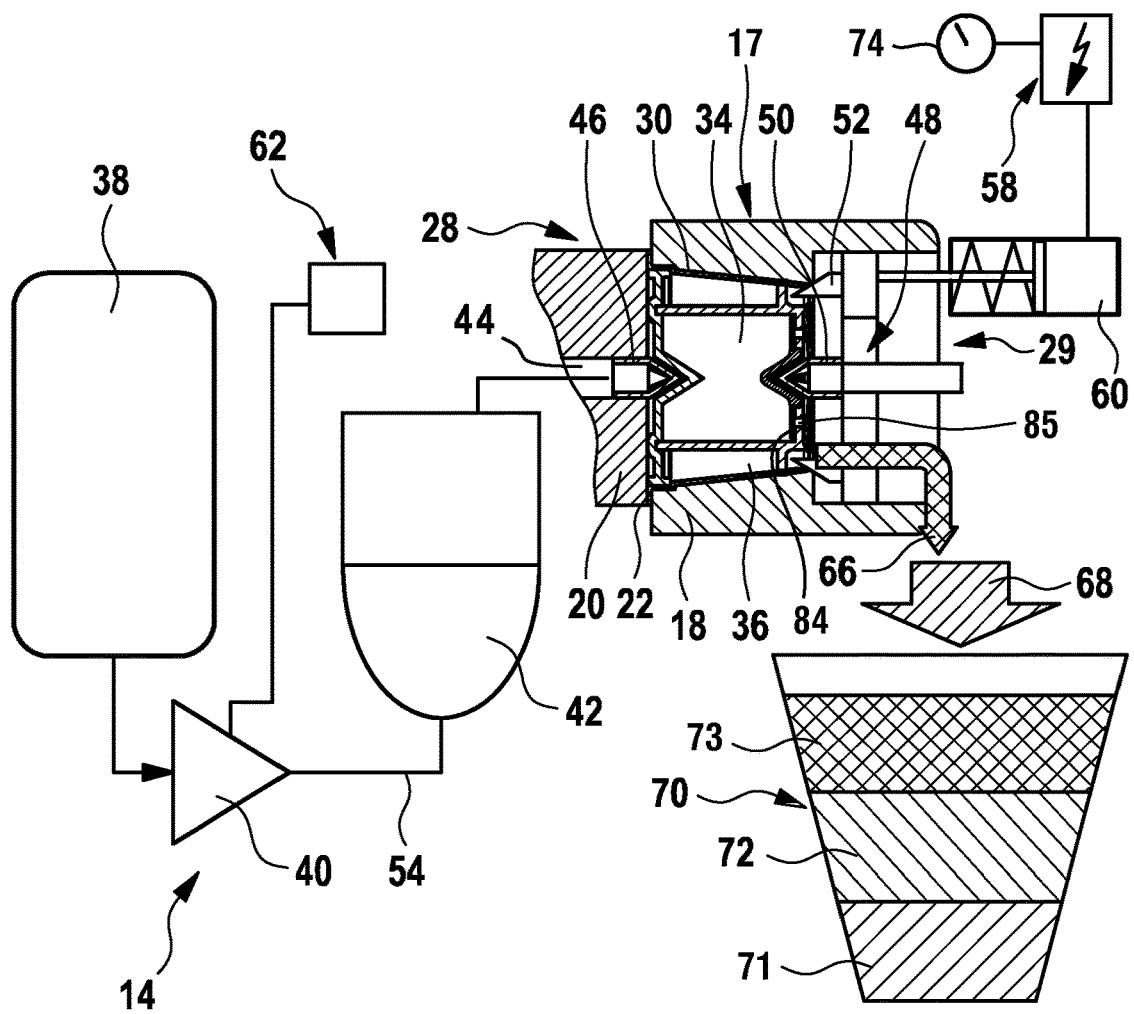
FIG. 5 shows a simplified schematic illustrative block representation of another exemplary embodiment of a processing unit, particularly a brewing unit, for a dispenser.

With particular reference to FIGS. 3 and 5, exemplary embodiments of a processing unit for a dispenser 10 are illustrated and further described. Generally, the processing unit 14 may be arranged to obtain a beverage or similar foodstuff product 70 (e.g. coffee, milk, cappuccino, cafe latte, latte macchiato, etc.) from a to-be-processed consumable 30. It may be desirable to prepare a great variety of different foodstuff products 70, e.g. foodstuff products 70 that comprise tasteful layers 71, 72, 73, refer to FIG. 5. The respective layers 71, 72, 73 may be substantially coffee-based, milk-based and/or foam or crema layers. To this end, in accordance with the present disclosure, so-called multi-chamber consumables 30 may be utilized. A multi-chamber consumable 30 may comprise two or more internal chambers 34, 36. By way of example, the exemplary consumable 30 illustrated in FIGS. 3 and 5 may comprise a first chamber 34 and a second chamber 36. The first chamber 34 may contain a first food substance 104 and the second chamber 36 may contain a second food substance 106, refer also to FIG. 9.

In one embodiment, the first food substance 104 may be milk-based or may contain milk powder. The second food substance 106 may be coffee-based or may comprise ground coffee. The respective food substances 104, 106 may be contained in or retained by paper-based or cloth(or: web)-based filter elements. From the food substances 104, 106, the foodstuff product may be obtained upon treatment with hot pressurized water. However, in some embodiments, the first chamber 34 or the second chamber 36 may be regarded as bypass chamber which may provide a bypass passage for water that may bypass the remaining chamber (or, more particularly, the outlet associated with the remaining chamber) in the course of the foodstuff product preparation process.

With reference to FIG. 5, a cappuccino-type or cafe latte-type foodstuff product may comprise a first base layer 71 that is primarily formed by liquid milk. Further, on top of the base layer 71, an intermediate layer 72 may be provided, that may contain a liquid coffee product. Furthermore, on top of the intermediate layer, a third layer or top layer 73 may be provided that preferably contains milk foam. In the course of the preparation of the foodstuff product 70, first of all, the base layer 71 may be generated. Consequently, the first chamber 34 may be initially filled with milk powder. By selectively engaging several outlet portions of the consumable 30, a shifted or time-displaced outlet flow comprising distinct fluids may be provided. Subsequently to the generation of the base layer 71, the intermediate layer 72 may be formed when coffee-based liquid flows out of the consumable 30. Consequently, the second chamber 36 may contain a respective coffee-based food substance. Since foamy components of the milk component typically comprise a significantly lower density than fluid milk and/or fluid coffee, the fluid coffee may basically flow through a foamy top layer of the base layer 71 and thereby be arranged between the (liquid) base layer 71 and the resulting (foamy) top layer 73.

Again, reference is made to both FIG. 3 and FIG. 5. As shown, the consumable 30 may be received at a receiving cavity 17, refer also to FIG. 1. The receiving cavity 17 may comprise a receiving portion 18 which corporates with a fastening portion 20 so as to receive the consumable 30 in a basically sealed manner. To this end, a sealing unit 22 comprising at least one seal may be provided. The sealing unit 22 may seal an inlet side 28 (also referred to as high-pressure side herein) in a basically pressure-tight manner. Preferably, at least in some embodiments, there is no requirement to seal an outlet side 29 (or referred to as low-pressure side herein) in a similar pressure-tight manner. Consequently, pressurized water may be supplied to the inlet side of the consumable 30 and leave the consumable 30 at the outlet side 29 which is basically subjected to ambient pressure.

Furthermore, the processing unit 14 may comprise a water tank 38 and a pump 40 to pressurize water obtained from the water tank 38. Further, a boiler or heater 42 may be provided to heat up the water. The pressurized hot water may be led to the consumable 30 via an inlet conduit or inlet passage 44. The processing unit 14 may further comprise an inlet piercing unit 46 and an outlet piercing arrangement 48 that are arranged to engage respective portions. The outlet piercing arrangement 48 may comprise a primary outlet piercing unit 50 and a secondary outlet piercing unit 52 that are arranged to engage respective portions at the outlet side 29.

The primary outlet piercing unit 50 and the secondary outlet piercing unit 52 may be basically operable in a manner independently of each other. Particularly, the primary outlet piercing unit 50 and the secondary outlet piercing unit 52 may engage or pierce the consumable 30 at different time instants in a time-displaced manner.

At least one of the inlet piercing unit 46 and the primary outlet piercing unit 50 may be arranged to engage its counterpart portion of the consumable 30 when the receiving portion 18 and the fastening portion 20 are brought into engagement or mutual abutment when the consumable 30 is inserted and locked in the receiving cavity 17.

Preferably, at least one of the inlet piercing unit 46 and the primary outlet piercing unit 50 are coupled with the fastening portion and the receiving portion 18, respectively. However, at least in some embodiments, at least one of the inlet piercing units 46, the primary outlet piercing unit 50 and the secondary outlet piercing unit 52 may be actuable independently of the fastening portion 20 and the receiving portion 18. To this end, at least one of the inlet piercing units 46, the primary outlet piercing unit 50 and the secondary outlet piercing unit 52 may be coupled with or actuated by respective actuators.

By way of example, as exemplarily shown in FIGS. 3 and 5, the secondary outlet piercing unit 52 may be actuable independently of the fastening portion 20 and the receiving portion 18. The secondary outlet piercing unit 52 may be coupled to an actuator unit 60 that may be controlled by an engagement control unit 58. As can be further seen in FIGS. 3 and 5, the actuator unit 60 may be basically operable to displace the secondary outlet piercing unit 52 or, more particularly, to urge the secondary outlet piercing unit 52 into engagement with the consumable 30. Generally, the actuator unit 60 may be an electrically operated actuator unit 60 (e.g. electric drive, electromagnet, etc.), a mechanically operated actuator unit 60 (e.g., spring operated), and/or a fluid operated actuator unit 60 (e.g., hydraulic drive).

FIG. 3 describes an embodiment in which the actuator unit 60 may comprise a hydraulic cylinder that may be coupled to the pressurized fluid system of the processing unit 14. Hence, an actuator fluid flow 56 may be established to actuate the actuator 60 and, consequently, the secondary outlet piercing unit 52. So as to control the engagement operation, a flow steering control arrangement or unit 62 may be provided with or coupled to at least one respective control element 59, 61, particularly to at least one control valve 59, 61. By way of example, the control element 61 is provided at the actuator flow path 56. By way of example, the control element or valve 59 is arranged at the inlet flow path 54 or the inlet conduit 44. Both the control elements 59, 61 may be operable to control flow properties, e.g. flow throughput and/or pressure. This may be beneficial, since in this way, on the one hand, the actuator unit 60 may be selectively controlled and operated to power the secondary outlet piercing unit 52 so as to engage the corresponding outlet portion basically independently of the engagement of the primary outlet piercing unit 50. Furthermore, characteristics of the main input flow 54 may be controlled so as to "trigger" an actuation of internal flow control arrangements that are provided in or at the consumable 30. To this end, in accordance with at least some embodiments as described herein, an integrated/internal flow control arrangement or unit 84 may be provided at the consumable 30 that may be arranged to selectively control an output flow through respective holes or passages 85 at the consumable 30. Respective embodiments of such a consumable 30 will be further elucidated and detailed hereinafter in connection with FIGS. 7 to 20, for instance.

Preferably, the actuation of the secondary engagement or piercing unit 52 and the internal flow control arrangement 84 are synchronized or at least adapted and/or basically aligned in time. This may be beneficial since processing the food substances 104, 106 that are contained in the chambers 34, 36 of the consumable 30 may be controlled even more precisely. In other words, as can be seen in FIG. 3, at a first stage of the foodstuff preparation process, a base layer 71 of the foodstuff product 70 may be formed which may be basically formed by an output flow 68 that is primarily formed by a flow component 64 that flows out of the consumable 30 via the primary outlet engagement unit 50. Since the secondary outlet engagement unit 52 is not brought into engagement in the initial stage as shown in FIG. 3, no respective secondary outlet flow may be established.

So as to "switch" between the primary outlet flow 64 and a secondary outlet flow 66 (refer to FIG. 5), two beneficial actions may be combined. On the one hand, the internal flow control arrangement 84 may be operated so as to close or block the respective passages 85 which may reduce or even substantially prevent any further primary outlet flow 64. This may be achieved, for instance, by selectively changing flow properties (e.g. throughput or pressure). On the other hand, the secondary outlet engagement unit 52 may be brought into engagement with respective outlet portions of the consumable 30. Since the primary outlet is more or less blocked by the internal flow control arrangement 84, the liquid flow of the processed foodstuff product basically bypasses the respective (blocked) outlet and flows out of the consumable via secondary outlets that are engaged by the secondary outlet engagement unit 52. As a consequence, a secondary output flow component 66 may be generated that forms the outlet flow 68. Preferably, the respective output flow components 64, 66 are associated with respective chambers 34, 36 of the consumable 30 and, more particularly, with food substances 104, 106 contained therein. It is worth mentioning in this connection that it is not necessarily required that a considerably "sharp" transition between the primary output flow component 64 and the secondary output flow component 66 is to be achieved.

FIG. 5 further illustrates an alternative controls configuration of the processing unit 14. For instance, the actuator unit 60 which can be controlled by the control unit 58 may be controlled on a time-dependent basis, refer to the timer indicated by reference numeral 74 in FIG. 5. Furthermore, an input flow steering unit 62 may be provided that may be adapted to control the pump unit 40, for instance. Consequently, the controls 58, 62 may be selectively actuated in a defined manner (at the same time instant or time-displaced) to operate the internal flow control arrangement 84 and, at the same time or with a defined temporal offset, the actuator unit 60 for the secondary outlet engagement unit 52.

Figure 4:
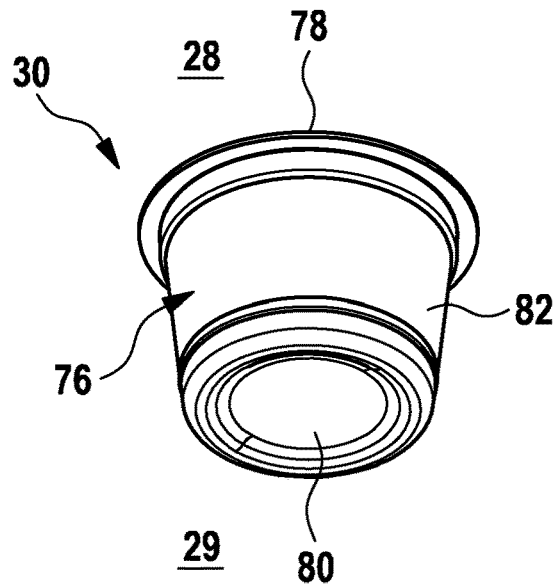
FIG. 4 shows a simplified perspective bottom view of an embodiment of a consumable in accordance with the present disclosure.
Figure 6:
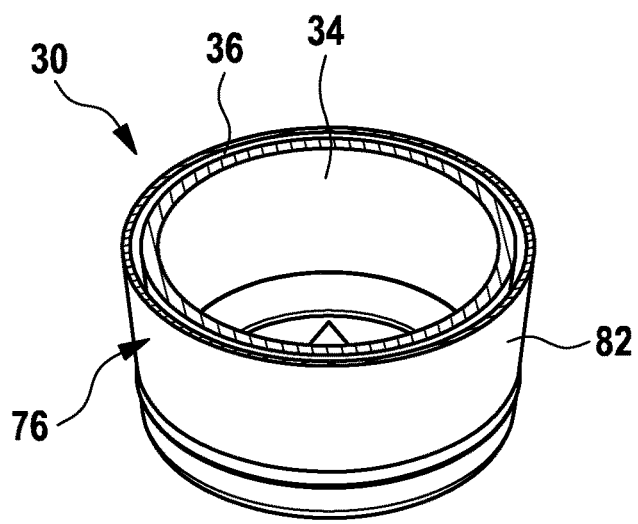
FIG. 6 shows a perspective cross-sectional top view of an embodiment of a consumable in accordance with the present disclosure.

Reference is made to FIG. 4 illustrating a perspective bottom view of a capsule-type consumable 30. Further reference is made to FIG. 6 illustrating a respective cross-sectional view. As can be seen from FIGS. 4 and 6, the consumable 30 may comprise a housing 76, particularly a relatively rigid housing 76 at least partially comprising plastic walls and/or aluminum walls that are impermeable to liquid or, more generally, at least substantially impermeable to fluids. At least in some embodiments, the housing 76 may be referred to as sealed housing, particularly as initially sealed housing that is sealed before being processed in the dispenser 10. For the purpose of this disclosure, the consumable 30 may comprise a first end 78 and a second end 80 that is opposite to the first end 78. Between the first end 78 and the second end 80, a rigid wall portion 82 may be provided. Generally, the first end 78 may be associated with the inlet side 28. Consequently, the second end 80 may be associated with the outlet side 29.

As used herein, the term "top" shall refer to the first end 78 of the consumables 30 for illustrative purposes. Further, the term "bottom" shall refer to the second end 80 of the consumables 30 for illustrative purposes. However, this assignment shall be not interpreted in a limiting sense. This is all the more the case since in some dispensers 10 consumables 30 can be received in a particular orientation wherein the first end 78 and the second end 80 of the consumable 30 is not necessarily aligned with the top of the dispenser 10 and the bottom, respectively.

In the consumable 30, the first chamber 34 and the second chamber 36 may be provided that may be arranged in a basically concentric fashion. The first chamber 34 may occupy a major portion of the consumable 30 and may be therefore referred to as primary chamber. The second chamber 36 may occupy a minor portion of the consumable 30 and may be therefore referred to as auxiliary chamber. The first chamber 34 may have a basically circular cross-section. The second chamber 36 may have a basically annular cross-section.

Figure 7:
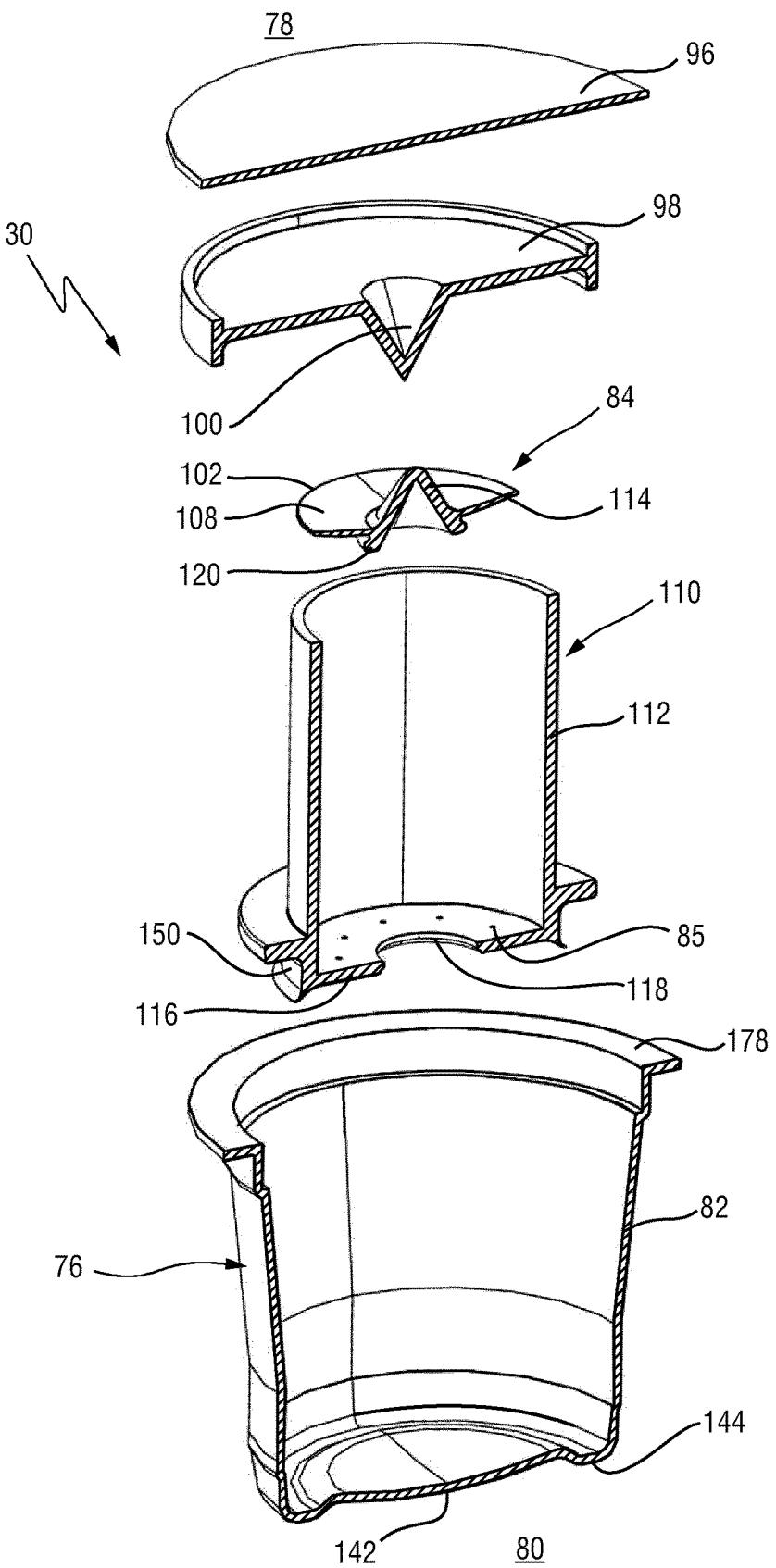
FIG. 7 shows a perspective exploded cross-sectional top view of an exemplary embodiment of a consumable in accordance with the present disclosure.

Reference is made to FIG. 7 illustrating a perspective cross-sectional to view of an exemplary embodiment of a consumable 30 in accordance with at least some principles of the present disclosure. Further reference in this connection is made to FIG. 8 illustrating a partial cross-sectional view of the consumable 30 of FIG. 7. In FIG. 8, for illustrative purposes, a first state of the internal flow control arrangement 84 is indicated by I. A second state of the internal flow control arrangement 84 is indicated by II. The consumable 30 comprises a housing 76 that may enclose an inner process or containing volume in a sealed manner. At a first end 78 of the housing 76, a lid or cover 96 may be provided. The lid or cover 96 may cover a top wall or fastening wall 98 of the housing 76. At the fastening wall 98, a conical recess or a recess 100 may be provided which may be adapted to an inlet piercer 86 of the inlet engagement unit 46, ref. also to FIG. 9. Adjacent to the fastening wall 98, respective chambers 34, 36 may be provided that may be configured to contain a food substance 104, 106 (refer to FIG. 9).

Further reference is made to FIG. 9 that illustrates a corresponding cross-sectional side view of an alternative embodiment of a consumable 30 which is sealingly received in a receiving cavity 17. FIG. 9 further exemplifies embodiments of the respective piercing or engagement units 46, 50, 52. Generally, the inlet piecing unit 46 may comprise at least one inlet piercing unit 46 may comprise at least one inlet piercer 86 or an arrangement of inlet piercers 86. Similarly, the primary outlet piercing unit 50 may comprise at least one primary outlet piercer 90 or an arrangement of primary outlet piercers 90. Similarly, the secondary outlet piercing unit 52 may comprise at least one secondary outlet piercer 94 or an arrangement of secondary outlet piercers 94. The inlet piercing unit 46, the primary outlet piercing unit 50 and the secondary outlet piercing unit 52 may be arranged or guided at the receiving portion 18 and/or the fastening portion 20. The at least one inlet piercer 86 may comprise at least one duct or conduit 88 to enable a fluid flow, particularly a flow of pressurized heated water into the consumable 30. The at least one primary outlet piercer 90 may comprise at least one duct or conduit 92 to enable a fluid flow, particularly a foodstuff product flow out of the consumable 30. Furthermore, the at least one secondary outlet piercer 52 may be provided with at least one duct or conduit 94 and thus be arranged in a similar fashion.

Again referring to an exemplary cappuccino-type consumable 30, the first food substance 104 contained in the first chamber 34 may comprise milk powder and the second food substance 106 contained in the second chamber 36 may comprise ground coffee.

Furthermore, an internal housing 110 may be provided in the (exterior) housing 76 to define (or: separate) a plurality of distinct chambers 34, 36 of the consumable 30, refer again to FIG. 7. Also the internal housing 110 may be shaped in a basically cup-like fashion. The internal housing 110 may comprise an inner boundary wall or inner wall portion 112 that may extend in a basically tubular or conical manner. In other words, the inner wall portion 112 may comprise an annular cross-section. The inner wall portion 112 may encircle the first chamber 34. Furthermore, the internal housing 110 may comprise an end wall 116 that may be referred to as outlet end wall or bottom end wall 116.

At a transition between the inner wall portion 112 and the end wall 116, a peripheral slot or recess may be provided that may define a peripheral channel 150 when the internal housing 110 is arranged in the housing 76 of the consumable. As can be best seen from FIGS. 9, 11 and 12, the internal housing 110 and the (exterior) housing 76 may jointly define the second chamber 36 which may comprise a basically annular cross-section and encircle the first chamber 34.

The end wall 116 may be arranged adjacent to the second end 80. Adjacent to the first end 78, the internal housing 110 may comprise an opening that may be covered by the fastening wall 98. The at least one through-hole or flow passage 85 that cooperates with the internal flow control arrangement 84 may be arranged at the end wall 116. More particularly, a plurality of considerably small through-holes or passages 85 may be provided that may basically encircle an opening or a receiving seat 118 that is arranged at a central portion of the end wall 116.

Figure 10:
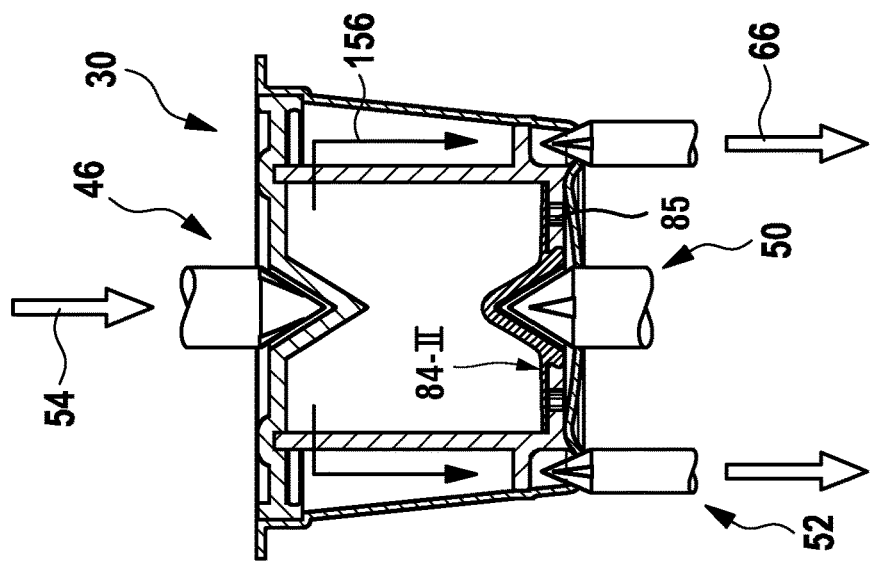
FIG. 10 shows a cross-sectional perspective top view of an internal flow control arrangement, particularly a flow control valve, the flow control valve being shown in a first state I and a second state II, wherein the second state II is indicated by dashed lines.

As can be further seen from FIG. 7, the internal flow control arrangement 84 may comprise a, or be arranged as a valve 102, particularly a washer-like valve. The valve 102 may comprise a deflectable portion 108, particularly a deflectable outer periphery 108. The valve 102 may be referred to as internal flow control valve. The valve 102 may be arranged to be received at the receiving seat 118 of the end wall 116 of the internal housing 110. To this end, the valve 102 may be provided with a respective mounting contour or mounting ring 120, refer also to FIG. 10. Furthermore, the valve 102 may be provided with a conical boss 114 that may be adapted to the primary outlet piercer 90, for instance. The valve 102 may be received at the receiving seat 118 in a basically sealed manner. The deflectable portion 108 may be arranged to assume a first state I and a second state II, refer also reference numerals 108-I, 108-II in FIG. 8. Further reference in this regard is made to FIG. 10 illustrating an enlarged perspective cross-sectional view of a respective valve 102. In FIG. 10, the second state or configuration of the deflectable portion 108 is indicated by dashed lines.

Further reference is made to FIG. 7 and to 9. For interaction with the primary inlet piercing unit 46, the primary outlet piercing unit 50 and the secondary outlet piercing unit 52, the consumable 30 may comprise respective engagement portions which can be ruptured by respective piercers. At the first end 78, at least one primary inlet portion 140 may be provided. The at least one primary inlet piercer 86 may engage (or: rupture) the primary inlet portion 140. At the second end 80 of the housing 76 at least one primary outlet portion 142 may be provided that can be associated with the first chamber 34. The at least one outlet piercer 90 may engage (or: rupture) the primary outlet portion 142. Further, at least one secondary outlet portion 144 may be provided at the housing 76 of the consumable 30 that may be associated with the second chamber 36. The at least one secondary outlet piercer 94 may engage (or: rupture) the secondary outlet portion 144. By way of example, the secondary outlet portion 144 may be provided at a peripheral zone of the second end 80.

The secondary outlet portion 144 may be coupled to a peripheral channel 150. Basically, the peripheral channel 150 may be jointly formed by the (exterior) housing 76 and the internal housing 110. The peripheral channel 150 may be shaped an as indentation or recess at the internal housing 110 that is covered by the housing 76. When the at least one secondary outlet piercer 94 of the secondary outlet piercing unit 50 penetrates or ruptures the secondary outlet portion 144, a secondary flow may be established that contributes to the formation to-be-processed foodstuff product 70, refer also to FIGS. 11 and 12.

By way of example, the secondary outlet engagement unit 52 may comprise respective secondary outlet piercers or blades 94 that are primarily arranged to engage the secondary outlet portion 144 to enable an outlet flow. Hence, the secondary outlet piercers or blades 94 do not necessarily have to provide (internal) conduits. Rather, a respective outlet flow may flow past the secondary outlet piercers 94 that are basically solid. However, in some embodiments, the secondary outlet piercers 94 may comprise at least one internal outlet flow channel or conduit.

As can be further seen from FIG. 9, at the high-pressure side or inlet side 28, a sealing unit 22 may engage and bias a peripheral edge 178 or the housing 76 that is received at the receiving portion 18 in a basically pressure-tight manner. Consequently, also the inlet portion 140 is sealed in a basically pressure-tight manner. To this end, the receiving portion 18 and the fastening portion 20 may be brought into engagement when the consumable 30 is received in the receiving cavity 17 of the processing unit 14. Hence, pressurized water may be supplied to the consumable 30 via the inlet portion 140. Further, at least the first chamber 34, preferably the first chamber 34 and the second chamber 36, may be pressurized accordingly. At the low-pressure side or outlet side 29, there is basically no need to seal any of the outlet portions 142, 144 in a pressure-tight manner.

FIG. 9 further illustrates an alternative embodiment of the internal flow control arrangement 84, particularly of the valve 102 thereof. The valve 102 of FIGS. 7, 8 and 10 comprises a washer-like or disc-like annular outer peripheral region 108 which is deflectable so as to be transferred between the first state I and the second state II. In the alternative, the valve 108 of the flow control arrangement 84 of FIG. 9 which is illustrated in the first state I and the second state II for illustrative purposes comprises an outer ring or mounting ring 120 that may attach the valve 102 to the inner housing 110, particular to the inner wall portion 112 thereof. Extending from the mounting ring 120, an inwardly extending peripheral edge or ring 108 may be provided that is deflectable between a first state I and a second state II.

Further reference is made to FIG. 8 and to FIG. 9 indicating the respective operation states or modes I, II of the internal flow control arrangement 84. In the first state I, the deflectable portion 108 is basically lifted from the flow passages 85. Correspondingly, an output flow through the passages 85 may be enabled. In the second state II, the deflectable portion 108 basically covers the passages 85. Consequently, the respective outlet flow may be significantly reduced or prevented. Through the passages 85, at least a component of the primary outlet flow 64 (refer to FIG. 3 and to FIG. 11) may be provided. As indicated above, a change between the first state I and the second state II of the internal flow control arrangement 84 may be induced, triggered or initiated by a change in flow properties, particularly by a change in throughput or pressure. The first state I may be referred to as a state where, if at all, only limited loads are applied to the valve 102, particular to the deflectable portion 108 thereof. The second state II may be referred to as a state where increased loads that exceed a defined threshold are applied to the valve 102, particularly to the deflectable portion 108 thereof. The higher the loads applied to the deflectable portion 108, the better the sealing function of the valve 102.

Figure 11:
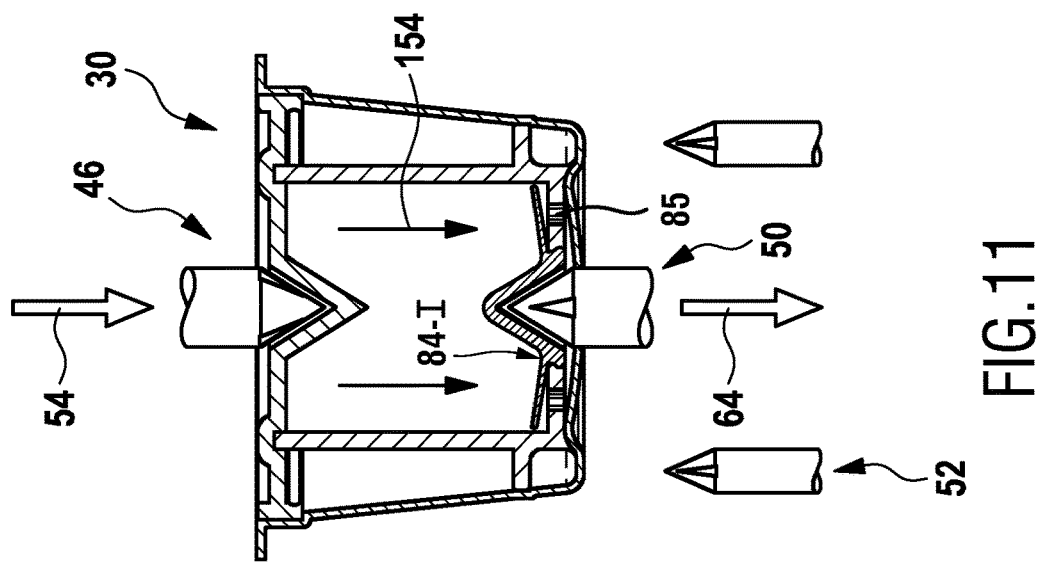
FIG. 11 shows a simplified cross-sectional side view of an embodiment of a consumable and a respective engagement arrangement in accordance with the present disclosure, the engagement arrangement being shown in a first engagement state.
Figure 12:
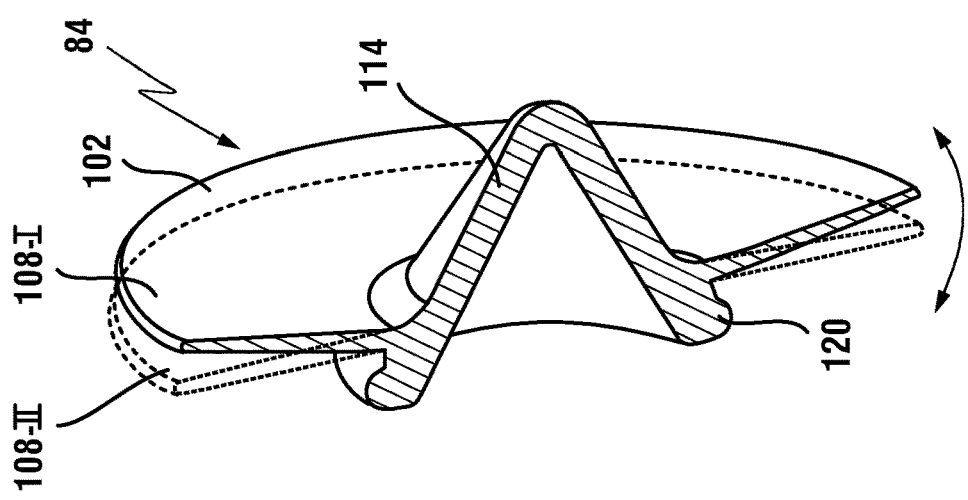
FIG. 12 shows another view of the arrangement of FIG. 11, the engagement arrangement being shown in a second engagement state, wherein an internal flow control arrangement of the consumable is synchronously arranged in the second state II.

Further reference is made to FIGS. 11 and 12 which illustrate in a schematic fashion distinct stages of a foodstuff preparation procedure. FIGS. 11 and 12 are based on the embodiment illustrated in FIGS. 7, 8 and 10 which, however, shall not be understood in a limiting sense. FIG. 11 illustrates a first engagement state in which the inlet engagement unit 46 and the primary outlet engagement unit 50 engage (or: pierce/rupture) the consumable 30 at the first end 78 and the second end 80, respectively. Consequently, an input flow 54 is enabled. Furthermore, since the internal flow control arrangement 84 is in the first state I, a primary output flow 64 is enabled between the inlet portion 140 and the outlet portion 142, refer also to FIG. 9, a primary fluid throughput 154 through the first chamber 34 may be established. Since the internal fluid control arrangement 84 is basically in an open state, fluid flow through the passages 85 is enabled.

By contrast, FIG. 12 illustrates a second engagement stage in which also the secondary outlet engagement unit 52 engages the respective secondary outlet portion 144 of the consumable 30. Furthermore, the internal flow control arrangement 84 is transferred or transformed into the second state II which may be also referred to as closed or sealed state. This may be triggered by a characteristic change in flow characteristics, e.g. by a respective increase in pressure and/or in throughput. Consequently, the primary outlet flow 64 (refer to FIG. 11) may be significantly reduced or even stopped. However, since the secondary outlet engagement unit 52 has been brought into engagement in the second state II, a secondary fluid throughput 156 may be established within the consumable 30 which preferably uses the second chamber 36. Consequently, a secondary output flow 66 may be established. In both the chambers 34, 36, pressurized water may react with food substances 104, 106 contained therein. Needless to say, the secondary fluid throughput 156 may be led through internal passages or holes between the first chamber 34 and the second chamber 36 so as to be led to the respective secondary outlet portion 144.

With reference to FIGS. 13 to 20, further alternative embodiments of consumables 30 within the general concept of the present disclosure will be illustrated and explained in more detail. It should be understood that, with respect to the embodiments disclosed herein, particular features are interchangeable and of course may form part of alternative embodiments. Consequently, the embodiments explicitly described herein may be regarded as forming a set of features which can be readily exploited by the skilled person so as to form further alternative embodiments that still fall within the context of the present disclosure. This applies in particular to alternative combinations of the embodiments and (sub-)aspects disclosed herein.

It is explicitly mentioned that the embodiments of the consumables 30 disclosed herein may be operable in an environment comprising only a single outlet engagement (or: piercing) unit 50, and in environments that comprise a primary outlet engagement unit 50 and a second outlet engagement unit 52. In either case, the internal flow control arrangement 84 may control the overall output flow of the consumable 30 so as to facilitate the preparation of multi-component beverages, etc.

Figure 13:
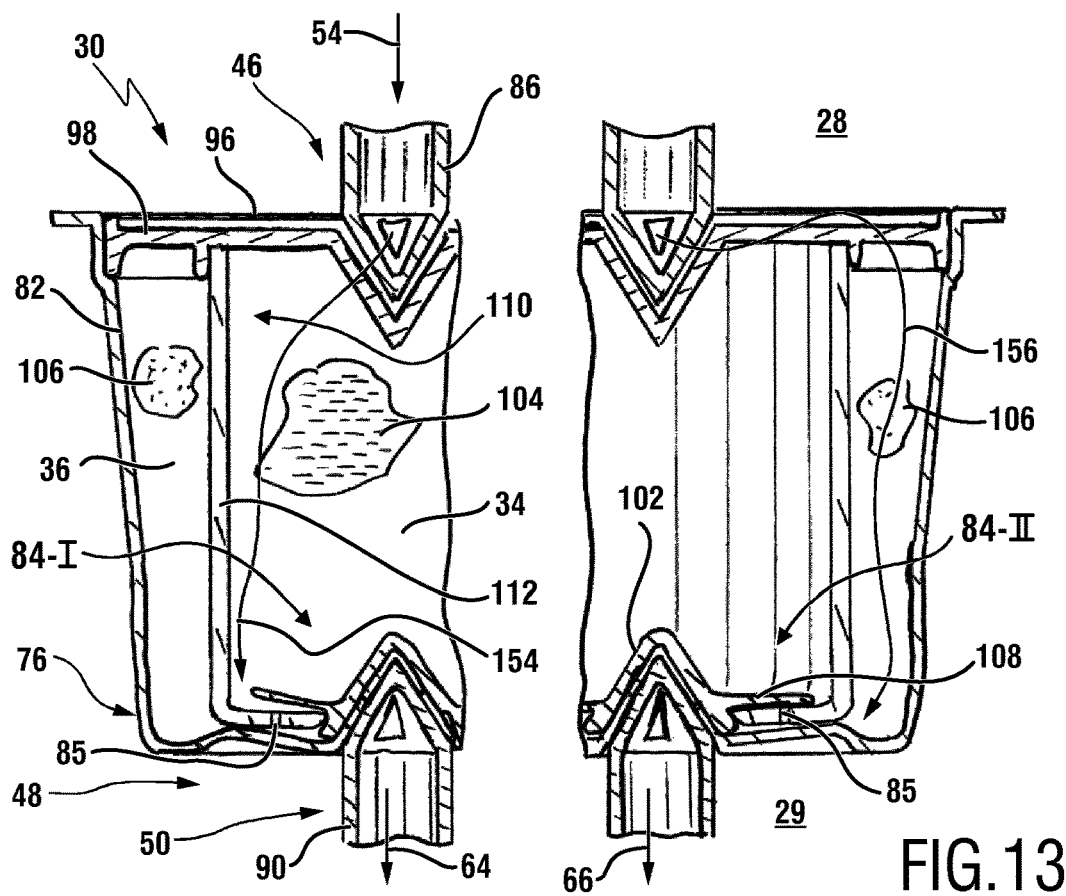
FIG. 13 shows complementary partial cross-sectional side views of another embodiment of a consumable in accordance with the present disclosure, the consumable comprising an internal flow control arrangement shown in a first state I and a second state II.

FIG. 13 shows an embodiment of a consumable 30 that basically corresponds to the embodiment illustrated in FIGS. 7, 11 and 12. As can be seen in FIG. 13, the consumable 30 is operable in a processing unit 14 (refer to FIGS. 3 and 5) that implements an outlet piercing arrangement 48 comprising only a primary outlet engagement unit 50 including a respective primary outlet piercer 90. Consequently, both the primary outlet flow 64 and the secondary outlet flow 66 may successively flow out of the consumable 30 in the vicinity of the same primary outlet piercer 90, or even through an output channel in the primary outlet piercer 90. Respective internal flow components are illustrated in FIG. 13 by arrows 154 indicating a primary fluid throughput (path) and 156 indicating a secondary fluid throughput (path). As used herein, there terms "primary" and "secondary" are mainly provided for the purpose of distinction and shall be therefore not interpreted in a limiting sense. The word "primary" thus does not necessarily indicate a major portion of the output flow or even a favored portion of the output flow. By way of example, the respective terms "primary" and "secondary" may rather relate to the order of the activation of the respective internal flow paths or chambers.

In the second state of the internal flow control arrangement (indicated by 84-II in FIG. 13), the valve 102 blocks the flow passages 85 and thus activates the secondary fluid throughput 156 through the second chamber 36 which may process the food substance 106 contained therein and eventually generate the secondary outlet flow 66 that may flow out of the consumable 30 via the primary outlet piercer 90.

Figure 14:
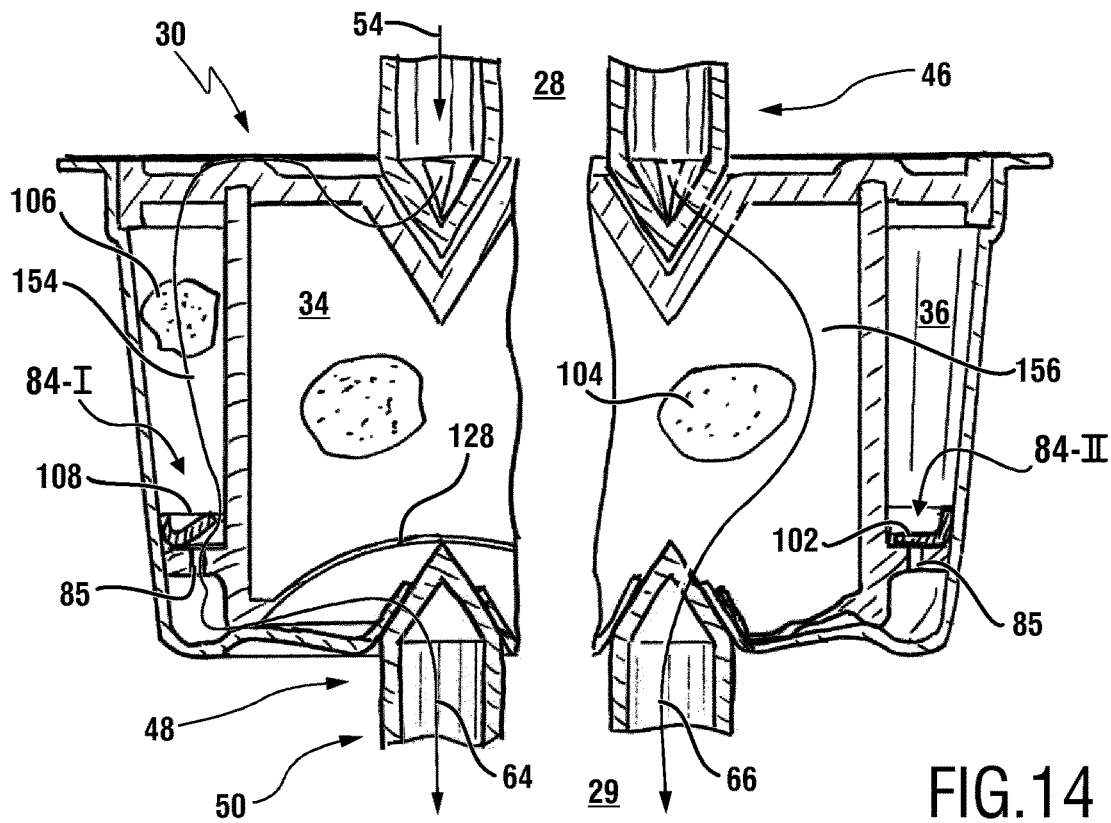
FIG. 14 shows complementary partial cross-sectional side views of yet another embodiment of a consumable in accordance with the present disclosure, the consumable comprising an internal flow control arrangement shown in a first state I and a second state II.

FIG. 14 exemplifies a similar embodiment of a consumable 30. The consumable 30 differs from the embodiment illustrated in FIG. 13 in that the internal flow control arrangement 84 is associated with the second chamber 36 an therefore shaped in an annular fashion. As can be further seen, in the first state 84-I, a primary fluid throughput 154 through the second chamber 36 is enabled when the deflectable portion 108 of the valve 102 is lifted from the passages 85. In the second state 84-II, the internal flow control arrangement 84 blocks the passages 85 and therefore the primary fluid throughput 154 and thus enables the secondary fluid throughput 156 which is led though the first chamber 34 in FIG. 14. As a further refinement, the first chamber 34 may be delimited by an end wall (or: dome wall) 128 that prevents an output flow out of the first chamber 34 as long as the end wall 128 is unimpaired. This contributes to the fluid flow control and further prevents reflow from the second chamber 36 to the first chamber 34 in the first state 84-I. Once the flow properties have been adapted so as to activate the first chamber 34, e.g. by an increased flow pressure, the end wall 128 may be ruptured so as to establish the secondary fluid throughput 156.

Figure 15:
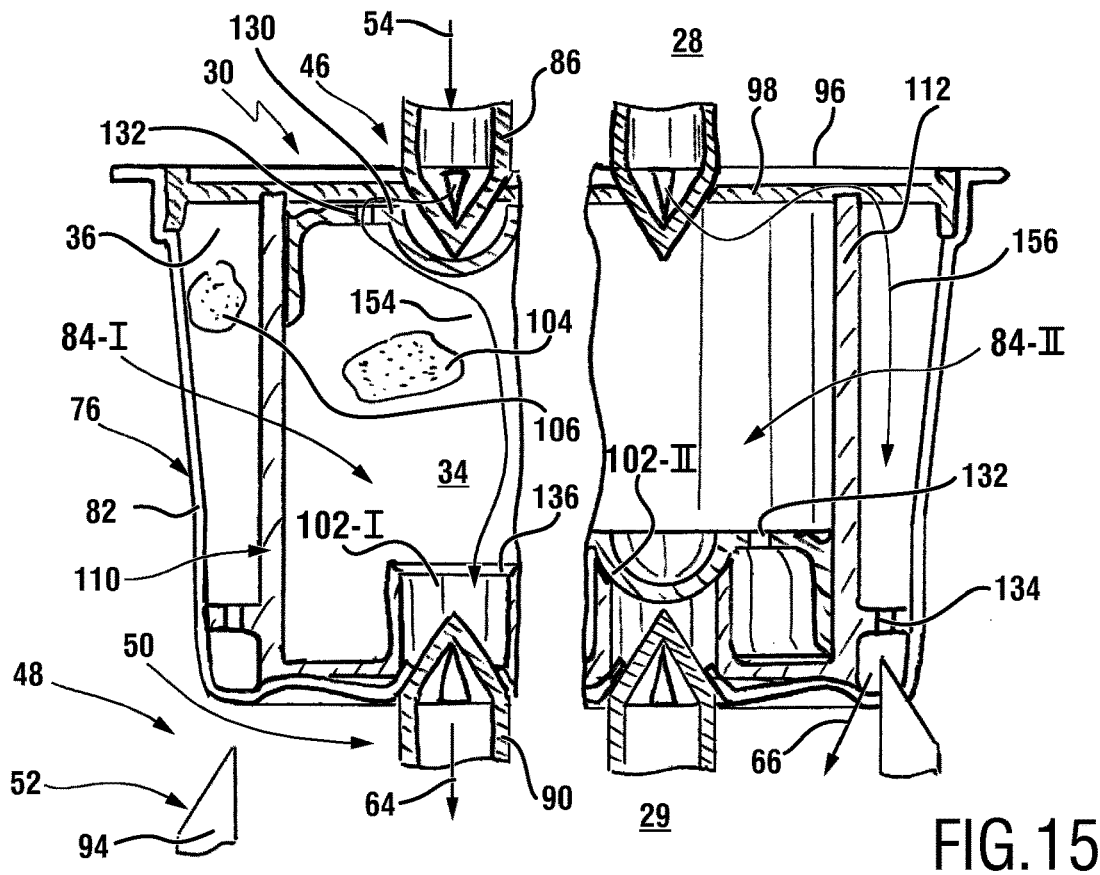
FIG. 15 shows complementary partial cross-sectional side views of yet another embodiment of a consumable in accordance with the present disclosure, the consumable comprising an internal flow control arrangement shown in a first state I and a second state II.

FIG. 15 illustrates another embodiment of a consumable 30 that implements an internal flow control arrangement 84 that may be operated between a first state 84-I and a second state 84-II. In FIG. 15, the internal flow control arrangement 84 implements a valve 102 that comprises a piston-like movable valve member 130 and a corresponding sealing seat 136 adjacent to the outlet side 29 of the consumable 30. Upon the exertion of pressure, the piston 130 may be actuated so as to slide along a guiding wall formed by the inner wall portion 112 of the internal housing 110 towards the sealing seat 136. The piston 130 and the sealing seat 136 may engage each other so as to block an outlet flow through the sealing seat 136. Initially, in the course of the foodstuff preparation process, a primary fluid throughput 154 through holes or passages 132 in the piston 130 may be established so as to process the first food substance 104 contained in the first chamber 34 that forms the output flow component 64. When the first food substance 104 is dissipated or processed, flow properties of the input flow 54 may be changed to as to actuate the piston 130 to slide into contact with the sealing seat 136. Consequently, the primary fluid throughput 154 through the passages 132 is basically blocked while the secondary fluid throughput 156 through the second chamber 36 and through respective holes or passages 134 may be induced. By way of example, the secondary fluid throughput 156 may flow out of the consumable 30 in the vicinity of the secondary outlet engagement arrangements 52 and respective secondary outlet piercers 94 and form the secondary output flow component 66.

Figure 16:
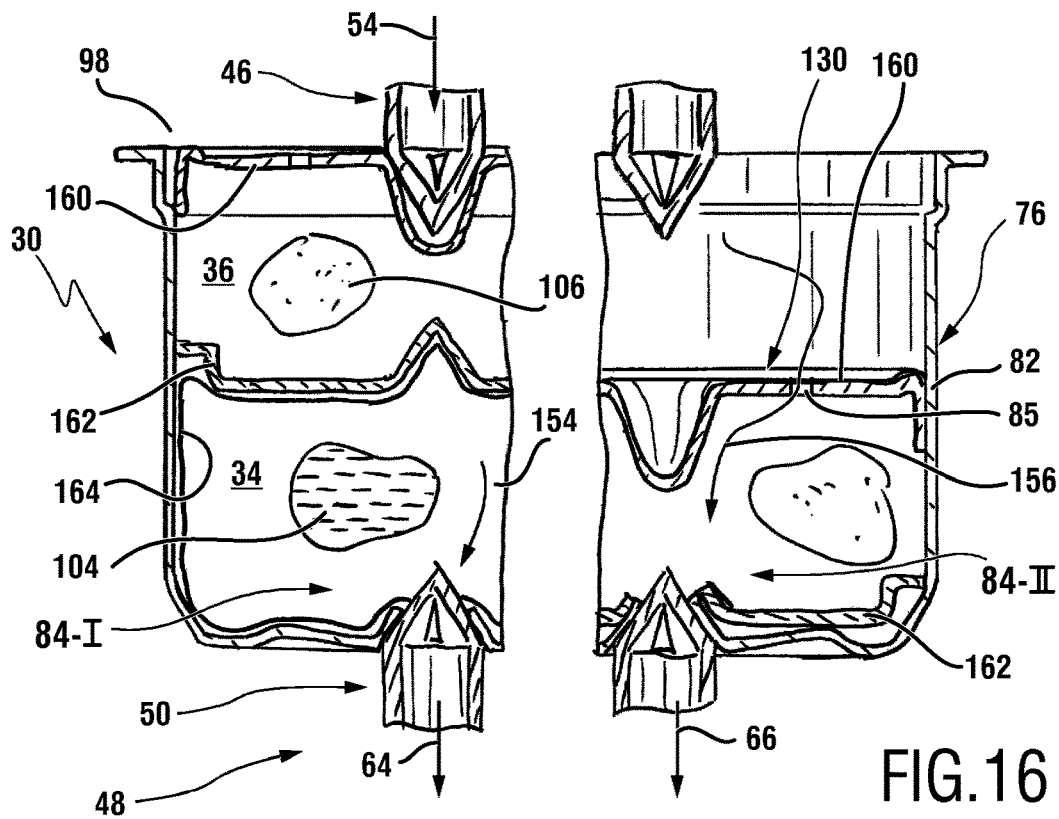
FIG. 16 shows complementary partial cross-sectional side views of yet another embodiment of a consumable in accordance with the present disclosure, the consumable comprising an internal flow control arrangement shown in a first state I and a second state II.

Yet another alternative embodiment is illustrated in FIG. 16. The consumable 30 exemplified therein actually comprises a first piston member 160 and a second piston member 162. The first piston member 160 may be referred to as inlet side piston member 160. The second piston member 162 may be referred to as outlet side piston member 162. The consumable 30 further comprises a bag or shell 164 which contains and encloses a first food substance 104, preferably a liquid food substance 104, for instance a milk-based liquid.

The bag or shell 164 may be arranged between the second piston member 162 and the end of the housing 76 that faces the outlet side 29. Further, a second food substance 106, particularly a ground or water-dissolvable food substance 106 may be arranged between the first piston member 160 and the second piston member 162. Consequently, a first chamber 34 that contains the first food substance 104 housed in the bag or shell 164, and a second chamber 36 that contains the second food substance 106 may be defined.

Initially, in the course of the foodstuff preparation process, both the first piston member 160 and the second piston member 162 may be subjected to the input flow 54 and (more or less) simultaneously moved towards the outlet side 29. This may have the effect that the bag or shell 164 is perforated or ruptured by the primary outlet engagement unit 50 and, consequently, the primary fluid throughput 154 may be established that may form the output flow component 64. In this stage, the second piston member 162 may actually act as a barrier that prevents the fluid flow guided thereto from the inlet side 28 to leave the consumable. Rather, the fluid flow generates a force that squeezes or compresses the bag or shell 164 so as to generate the output flow component 64.

Once the bag or shell 164 is at least substantially emptied, the second piston member 162 may be engaged by the primary outlet engagement unit 50 and, as a consequence, perforated or broken. Hence, the secondary fluid throughput 156 may be established that may form the secondary output flow component 66. The secondary fluid throughput 156 may be formed by the input flow 54 that processes the second food substance 106 contained in the second chamber 36 between the first piston member 160 and the second piston member 162. The consumable 30 illustrated in FIG. 16 embodies a double-piston flow control arrangement 84 that may be operated between two states 84-I and 84-II.

Figure 17:
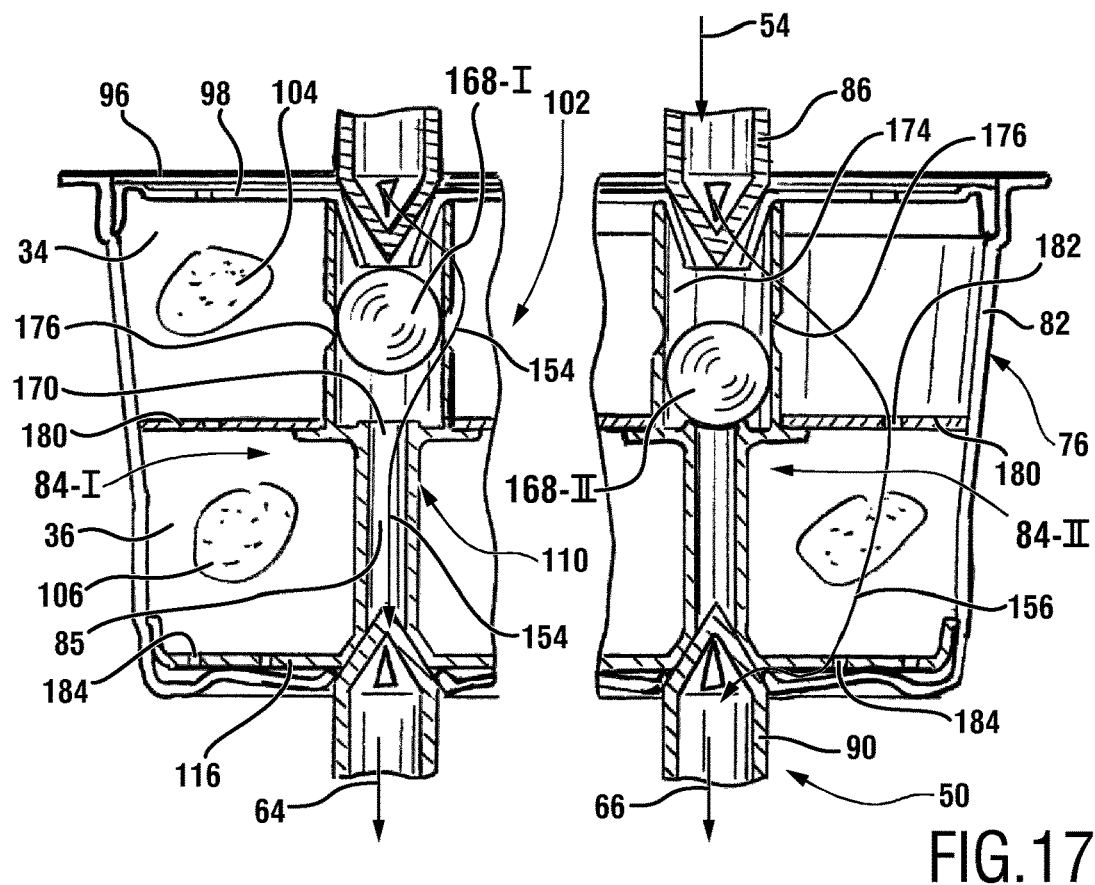
FIG. 17 shows complementary partial cross-sectional side views of yet another embodiment of a consumable in accordance with the present disclosure, the consumable comprising an internal flow control arrangement shown in a first state I and a second state II.
Figure 18:
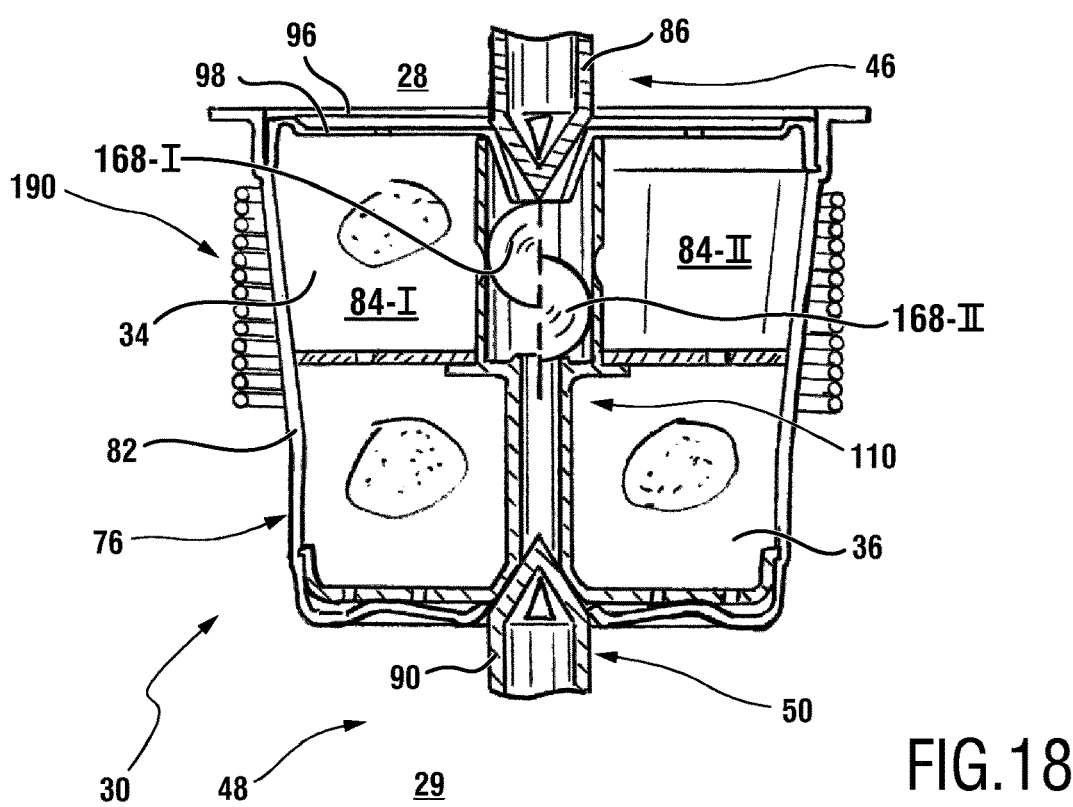
FIG. 18 shows another cross-sectional side view of a further embodiment of an internal flow control arrangement of a consumable in accordance with FIG. 17.

FIG. 17 and FIG. 18 illustrate another exemplary embodiment of an internal flow control arrangement 84 for a consumable 30 and a refinement thereof, respectively. The internal flow control arrangement 84 comprises a valve 102 that utilizes a ball member 168 that is movable to selectively block or enable a flow through a sealing seat 170. Adjacent to the sealing seat 170, the passage 85 may be provided that leads to the outlet side 29. The ball member 168 is arranged in a receiving tube 174 that may be formed by or arranged at the internal housing 110. The receiving tube 174 may further comprise at least one side opening or lateral opening 176 that connects the receiving tube 174 and the first chamber 34. Furthermore, the consumable 30 comprises a separation wall 180 the separates an inner space of the housing 76. Consequently, the separation wall 180 separates the first chamber 34 and the second chamber 36 that may be arranged in the vicinity of each other. The first chamber 34 is arranged adjacent the inlet side 28. The second chamber 36 is arranged adjacent to the outlet side 29. The first chamber 34 comprises a first food substance 104. The second chamber 36 comprises a second food substance 106. The receiving tube 174 may be implemented in the internal housing 110.

So as to actuate the ball-type valve 102, flow properties of the input flow 54 may be set in accordance with a required actuation force of the ball member 168. In the separation wall 180, perforations 182 may be provided that may be passed when flow properties of the input flow 54 exceed defined thresholds. Similarly, perforations 184 may be provided in the bottom end wall 116 that may by passed by the flow that flows out of the second chamber 36. Consequently, the ball member 168 may be urged from a first state (84-I, 168-I) in which a primary fluid throughput 154 through the sealing seat 170 is enabled to a second state (84-II, 168-II) in which a secondary fluid throughput 156 through the perforations 182 and the perforations 184 is enabled. Both, the output flow component 64 and the output flow component 66 may flow out of the consumable 30 via the primary outlet engagement unit 50, particularly through the primary outlet piercer 90.

FIG. 18 illustrates an alternative actuation of the internal flow control arrangement 84 and particularly of the ball member 168. To this end, the processing unit 14 may comprise an actuator coil 190 that may be energized so as to exert an actuation force on the ball member 168 to move the ball member 168 from the first state (168-I) into the second state (168-II), ref. also to FIG. 17. Accordingly, the ball member 168 is preferably made from metal material, particularly from ferromagnetic material. Consequently, the consumable 30 as shown in FIGS. 17 and 18 may be operated via a defined setting of flow properties (pressure, temperature, flow amount, etc.), particularly of the input flow 54. Alternatively, or in addition, as shown in FIG. 18, the consumable 30 may be operated via magnetic force by a separate actuation unit that implements the actuator coil 190, a corresponding power unit, and respective controls.

Figure 19:
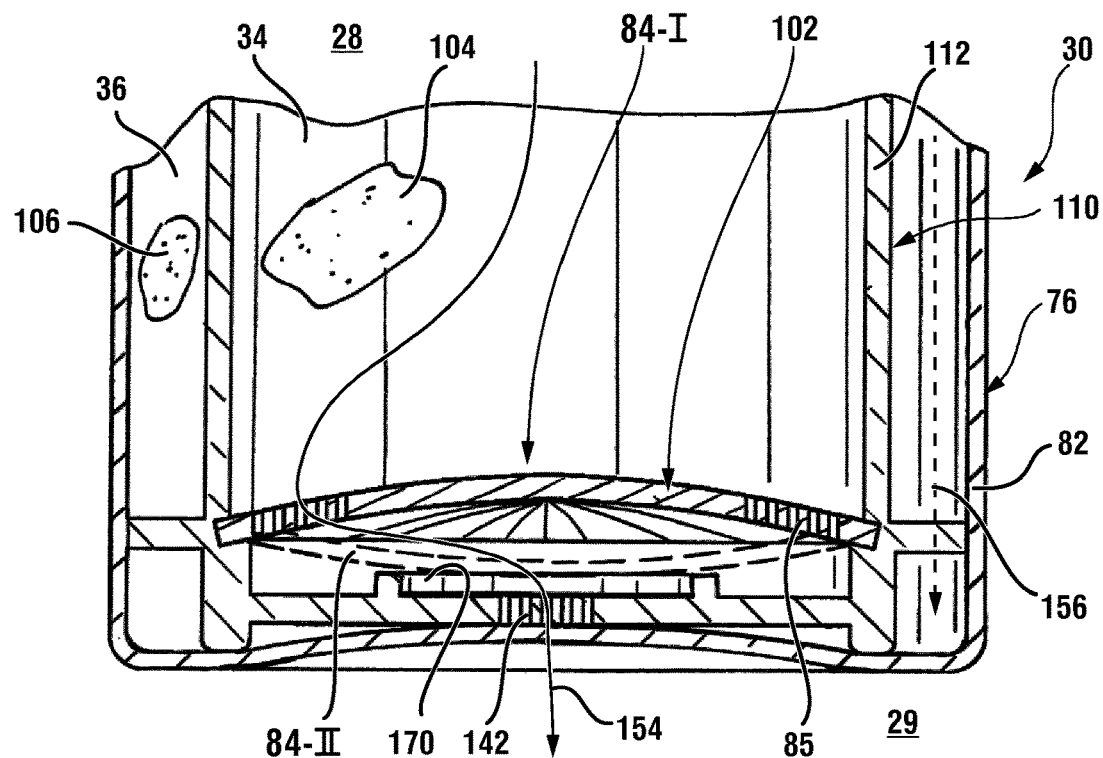
FIG. 19 shows a partial cross-sectional side view of yet another embodiment of a consumable in accordance with the present disclosure, the consumable comprising an internal flow control arrangement shown in a first state I and a second state II.
Figure 20:
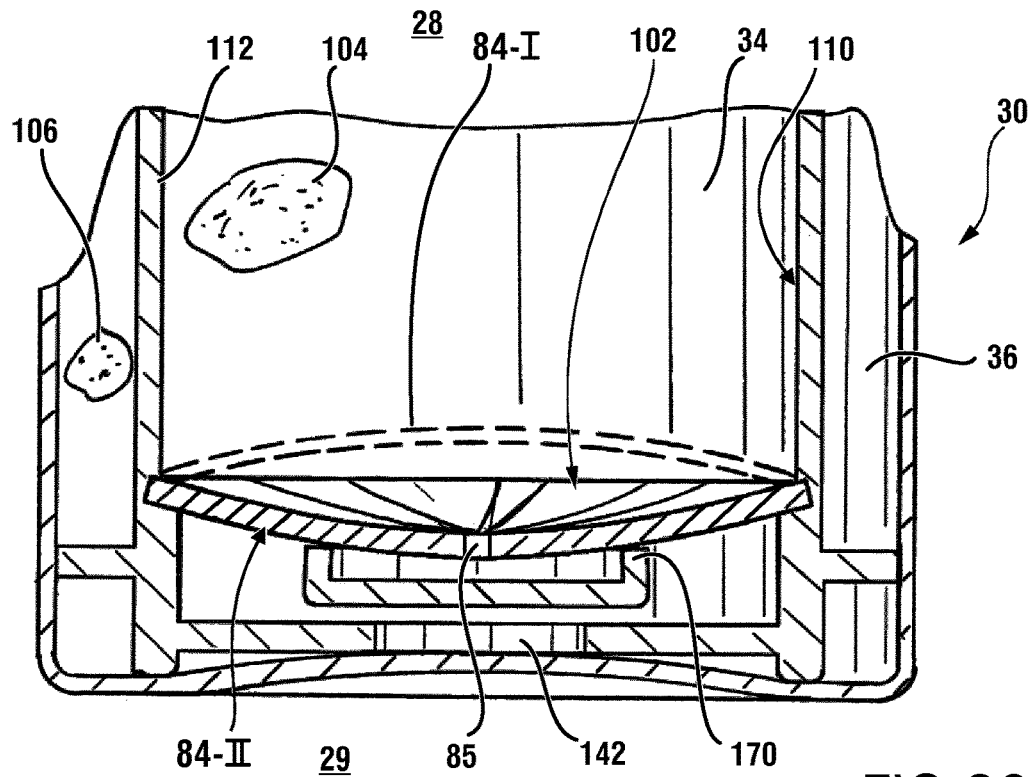
FIG. 20 shows a partial cross-sectional side view of still another embodiment of a consumable in accordance with the present disclosure, the consumable comprising an internal flow control arrangement shown in a first state I and a second state II.

Further reference is made to FIGS. 19 and 20 that illustrate partial views of consumables 30 that implement further embodiments of internal flow control arrangements 84 including valves 102 that are arranged in a membrane-type fashion. FIG. 19 shows an internal flow control arrangement 84 in a first state (84-I) while a second state (84-II) is indicated by dashed lines. FIG. 20 shows an internal flow control arrangement 84 in a second state (84-II) while a first state (84-I) is indicated by dashed lines. As already indicate and explained above, the consumable 30 may comprise a housing 76 in which a first chamber 34 and a second chamber 36 is defined that may comprise a first food substance 104 and a second food substance 106. Further, the consumable 30 may be engaged by an outlet piercing arrangement 48 that may implement a primary outlet engagement unit 50 and, in some cases, a secondary outlet engagement arrangement 52. The membrane-type valves 102 shown in FIGS. 19 and 20 are basically arranged in a circular manner and may flex between two (bulged) states. In some embodiments, the valves 102 may be referred to as bi-stable valves. The valves 102 are arranged at the inner wall portion 112 of the internal housing 110 and adjacent to a sealing seat 170. The sealing seat 170 may be operatively coupled to an outlet portion 142 of the consumable 30. In the first state 84-I of the internal flow control arrangement 84, the valves 102 shown in FIGS. 19 and 20 are lifted or domed towards the inlet side 28. Therefore, the sealing seat 170 is not blocked by the valve 102. Consequently, a primary fluid throughput 154 may be enabled that passes the first chamber 34, the flow passage 85 in the valve 102 and the outlet portion 142. In the second state 84-II of the internal flow control arrangement 84, the valves 102 shown in FIGS. 19 and 20 are recessed or domed towards the outlet side 29. Consequently, the sealing seat 170 is covered by the valve 102 such that no primary fluid throughput 154 through the flow passage 85 in the valve 102 and the sealing seat 170 towards and through the outlet portion 142 may be established.

When the valve 102 is in the first state, as shown in FIG. 19, a primary fluid throughput 154 through flow passage 85 provided in the valve 102 and the outlet portion 142 of the consumable 30 is enabled. A secondary fluid throughput 156 which is enabled in the second state of the valve 102 is indicated by a dashed line in FIG. 19. The embodiments illustrated in FIGS. 19 and 20 differ from each other in that a plurality of passages 85 is arranged in a circular fashion at the valve 102 in FIG. 20. The corresponding sealing seat 170 in FIG. 19 defines a contact ring which surrounds a central outlet flow portion 142. Hence, in the second (blocked) state no flow between the flow passage 85 and the central outlet flow portion 142 may be established since the membrane-type valve 102 is sealingly received at the sealing seat 170.

By contrast, in FIG. 20, the flow passage 85 is arranged in the central region of the membrane-type valve 102. Further, the corresponding sealing seat 170 defines a contact ring which does not surround an outlet flow passage but rather a closed end surface. In the first state, the valve 102 is sufficiently lifted from the sealing seat 170 and its contact ring such that a flow through the flow passage 85 of the valve 102 may pass the sealing seat 170 and reach the outlet portion 142 of the housing 76 of the consumable 30 which is offset from the closed end surface of the sealing seat 170 towards the outlet side 29. In the second state, the valve 102 is sealingly received at the contact ring of the sealing seat 170. The flow may actually pass the flow passage 85 in the valve 102. However, the flow cannot pass the closed end surface of the sealing seat 170 as long as the valve 102 contacts the contact ring.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A capsule-type, food substance containing consumable for use in a dispenser for preparation of foodstuff products, particularly a beverage, the consumable comprising:
   a housing comprising at least one rigid wall portion that is impermeable to liquid,
   an inlet portion arranged to enable pressurized water flow into the housing, when the consumable is inserted in a processing unit of the dispenser,
   at least one primary outlet portion arranged to enable a primary fluid flow out of the housing,
   at least two distinct chambers arranged in the housing, and
   an internal flow control arrangement operatively coupled with at least one of the at least two distinct chambers, wherein the internal flow control arrangement is operable between a first state and a second state to selectively permit or prevent a fluid flow from said at least one chamber so as to activate a primary fluid throughput through said at least one chamber in the first state and a secondary fluid throughput through another one of said chambers in the second state, and wherein the internal flow control arrangement is configured to prevent the fluid flow from said at least one chamber, so as to activate the secondary fluid throughput from the other one of said chambers.

2. The consumable as claimed in claim 1, further comprising at least one secondary outlet portion arranged to enable a distinct secondary fluid flow out of the housing, wherein a first chamber of the at least two distinct chambers is coupled to the at least one primary outlet portion, and wherein a second chamber of the at least two distinct chambers is coupled to the at least one secondary outlet portion.

3. The consumable as claimed in claim 2, wherein the internal flow control arrangement is associated with the at least one primary outlet portion or the at least one secondary outlet portion, and wherein the internal flow control arrangement is operable between the first state in which an output flow through the respective outlet portion is enabled, and the second state, in which the output flow through the respective outlet portion is at least substantially prevented.

4. The consumable as claimed in claim 2, wherein the at least one rigid wall portion of the housing is made from metal material or plastic material and shaped in a basically rotationally symmetric fashion defining an inlet end associated with the inlet portion, and an outlet end associated with the at least one primary outlet portion and the at least one secondary outlet portion, wherein the consumable comprises an inner housing that subdivides the housing into the at least two distinct chambers, wherein the at least one primary outlet portion is associated with the first chamber, and wherein the at least one secondary outlet portion is associated with the second chamber.

5. The consumable as claimed in claim 4, wherein the internal flow control arrangement is arranged at a central portion of the inner housing and adjacent to the outlet end of the consumable.

6. The consumable as claimed in claim 4, wherein the first chamber comprises a basically circular profile, wherein the second chamber comprises a basically annular profile that surrounds the profile of the first chamber, wherein the at least one primary outlet portion is arranged at a central portion of the outlet end, and wherein the at least one secondary outlet portion is arranged at a peripheral region of the outlet end.

7. The consumable as claimed in claim 1, wherein the internal flow control arrangement comprises at least one flow control valve, particularly a pressure-dependent or flow-dependent flow control valve, which is operable based on internal fluid flow properties.

8. The consumable as claimed in claim 7, wherein the internal flow control arrangement at least substantially blocks respective output flow when a flow parameter, particularly pressure or throughput, exceeds a defined threshold.

9. The consumable as claimed in claim 1, wherein the internal flow control arrangement comprises a flow control valve that is made from resilient material, particularly from rubber or rubber-based material.

10. The consumable as claimed in claim 9, wherein the flow control valve comprises a deflectable portion that selectively covers a respective flow passage of the consumable in the second state and exposes the flow passage in the first state.

11. The consumable as claimed in claim 10, wherein the deflectable portion, in the absence of externals loads, is in a steady condition and at least partially bent away or lifted from respective flow conduits of the consumable that form the flow passage, and wherein an external load, caused by an increased flow or an increased pressure, deforms the deflectable portion when transitioning between the first state and the second state.

12. A processing unit for a dispenser for preparation of foodstuff products, the processing unit comprising:
    a receiving cavity for receiving a consumable, the receiving cavity comprising at least a first receiving portion and at least a first fastening portion,
    a sealing unit arranged to contact, at an inlet side, a first end of the consumable, such that an inlet portion of the consumable can be engaged in a basically pressure-tight manner,
    an inlet engagement unit that is coupled to an inlet conduit through which pressurized water can be supplied, wherein the inlet engagement unit is operable to engage the inlet portion of the consumable to process a foodstuff product in the consumable,
    an outlet engagement arrangement comprising:
       a primary outlet engagement unit that is operable to engage at least one primary outlet portion of the consumable at an outlet side thereof to enable the processed foodstuff product to flow out of the consumable, and
    an input flow steering arrangement that is operable to control flow parameters of an input flow to actuate an internal flow control arrangement of the consumable,
    wherein the processing unit is arranged to process a consumable as claimed in any of the preceding claims so as to operate the internal flow control arrangement thereof.

13. The processing unit as claimed in claim 12, further comprising:
    a secondary outlet engagement unit that is implemented in the outlet engagement arrangement, wherein the secondary outlet engagement unit is operable to engage at least one secondary outlet portion of the consumable at the outlet side to enable the processed foodstuff product to flow out of the consumable, and an engagement control unit that is operable to control the secondary outlet engagement unit such that the primary outlet engagement unit and the secondary outlet engagement unit engage the consumable in a time-displaced manner.

14. The processing unit as claimed in claim 13, wherein the input flow steering arrangement and the engagement control unit are coupled to co-ordinate or synchronize an increase in the input flow and the engagement of the secondary outlet engagement unit.

15. The processing unit as claimed in claim 12, further comprising a magnetic actuator unit, particularly an actuator coil, wherein the magnetic actuator unit is operable to exert an actuation force on a movable valve member of the internal flow control arrangement of the consumable to remotely operate the movable valve member between a first state and a second state to selectively permit or prevent a fluid flow from said at least one chamber.

16. A dispensing appliance for preparation of foodstuff products, particularly a beverage dispenser, the dispensing appliance comprising:

a water tank, a pump unit for pressurizing water supplied from the water tank, a heating unit for heating pressurized water, and a processing unit as claimed in claim 12.

17. A capsule-type, food substance containing consumable for use in a dispenser for preparation of foodstuff products, particularly a beverage, the consumable comprising:

a housing comprising at least one rigid wall portion that is impermeable to liquid, an inlet portion arranged to enable pressurized water flow into the housing, when the consumable is inserted in a processing unit of the dispenser, at least two distinct chambers arranged in the housing, and an internal flow control arrangement operatively coupled with at least one of the at least two distinct chambers, wherein the internal flow control arrangement is operable to switch between:

a primary fluid flow through a first chamber of the at least two distinct chambers, and a secondary fluid flow through a second chamber of the at least two distinct chambers, wherein the internal flow control arrangement is configured to prevent the primary fluid flow from the first chamber so as to activate the secondary fluid flow from the second chamber.

18. The consumable as claimed in claim 17, further comprising:

at least one primary outlet portion arranged to enable the primary fluid flow out of the housing, and at least one secondary outlet portion arranged to enable the secondary fluid flow out of the housing, wherein the first chamber is coupled to the at least one primary outlet portion, and the second chamber is coupled to the at least one secondary outlet portion.

\* \* \* \* \*